(12) United States Patent
Yu et al.

(10) Patent No.: US 12,245,244 B2
(45) Date of Patent: Mar. 4, 2025

(54) METHOD AND APPARATUS FOR BEAM MANAGEMENT

(71) Applicant: SHARP KABUSHIKI KAISHA, Sakai (JP)

(72) Inventors: Chia-Hao Yu, Taipei (TW);
Chien-Chun Cheng, Taipei (TW);
Hung-Chen Chen, Taipei (TW);
Chie-Ming Chou, Taipei (TW)

(73) Assignee: SHARP KABUSHIKI KAISHA, Sakai (JP)

(*) Notice: Subject to any disclaimer, the term of this patent is extended or adjusted under 35 U.S.C. 154(b) by 181 days.

(21) Appl. No.: 17/620,297

(22) PCT Filed: Jul. 9, 2020

(86) PCT No.: PCT/CN2020/101063
§ 371 (c)(1),
(2) Date: Dec. 17, 2021

(87) PCT Pub. No.: WO2021/008433
PCT Pub. Date: Jan. 21, 2021

(65) Prior Publication Data
US 2022/0338230 A1 Oct. 20, 2022

Related U.S. Application Data

(60) Provisional application No. 62/873,411, filed on Jul. 12, 2019.

(51) Int. Cl.
*H04W 72/23* (2023.01)
*H04W 84/06* (2009.01)

(52) U.S. Cl.
CPC ............ *H04W 72/23* (2023.01); *H04W 84/06* (2013.01)

(58) Field of Classification Search
None
See application file for complete search history.

(56) References Cited

U.S. PATENT DOCUMENTS

2019/0149380 A1* 5/2019 Babaei ............ H04W 72/0446
370/330
2019/0191464 A1* 6/2019 Loehr .................... H04W 72/23
(Continued)

FOREIGN PATENT DOCUMENTS

| CN | 110519843 A | 11/2019 |
|---|---|---|
| WO | 2019/093764 A1 | 5/2019 |
| WO | 2019/099659 A1 | 5/2019 |

OTHER PUBLICATIONS

John Wilson—U.S. Appl. No. 62/647,596 (Provisional) (Year: 2018).*
(Continued)

*Primary Examiner* — Andre Tacdiran
(74) *Attorney, Agent, or Firm* — ScienBiziP, P.C.

(57) ABSTRACT

A method for beam management performed by a UE is provided. The method includes: receiving a DCI format in a first BWP based on a first QCL assumption specific to the first BWP, the DCI format scheduling a PDSCH reception in a second BWP; receiving an RRC configuration that includes a plurality of candidate TCI states associated with a serving cell in which the PDSCH is scheduled; receiving a MAC CE that indicates a subset of the plurality of candidate TCI states for activation in the second BWP; determining a second QCL assumption specific to the second BWP based on one TCI state in the subset; and receiving the PDSCH in the second BWP based on the second QCL assumption.

20 Claims, 14 Drawing Sheets

(56) References Cited

U.S. PATENT DOCUMENTS

| | | | | |
|---|---|---|---|---|
| 2019/0239212 A1* | 8/2019 | Wang | ............ | H04L 5/0051 |
| 2019/0254110 A1* | 8/2019 | He | ............ | H04L 5/0048 |
| 2019/0254114 A1* | 8/2019 | Son | ............ | H04L 5/001 |
| 2019/0306867 A1* | 10/2019 | Cirik | ............ | H04W 72/0453 |
| 2019/0364602 A1* | 11/2019 | Yi | ............ | H04W 72/20 |
| 2019/0373450 A1* | 12/2019 | Zhou | ............ | H04L 5/001 |
| 2020/0053775 A1* | 2/2020 | Lee | ............ | H04W 74/0808 |
| 2020/0295824 A1* | 9/2020 | Charbit | ............ | H04L 1/1864 |
| 2020/0313795 A1* | 10/2020 | Xu | ............ | H04B 7/0628 |
| 2020/0314829 A1* | 10/2020 | Venugopal | ............ | H04W 72/23 |
| 2020/0404525 A1* | 12/2020 | Rahman | ............ | H04L 5/0007 |
| 2021/0091900 A1 | 3/2021 | Zhang et al. | | |
| 2021/0167839 A1* | 6/2021 | Zhang | ............ | H04W 76/19 |
| 2021/0203536 A1* | 7/2021 | John Wilson | ............ | H04L 5/0098 |
| 2022/0104031 A1* | 3/2022 | Matsumura | ............ | H04W 72/23 |
| 2022/0225119 A1* | 7/2022 | Liberg | ............ | H04L 5/0048 |

OTHER PUBLICATIONS

Venugopal—U.S. Appl. No. 62/826,810 (Provisional) (Year: 2019).*
Liberg—U.S. Appl. No. 62/841,280 (Provisional) (Year: 2019).*
Rahhman—U.S. Pat. No. 6,286,375 (Provisional) (Year: 2019).*
Panasonic, "QCL related issues during BWP switching", R1-1806390, 3GPP TSG-RAN WG1 Meeting #93, Busan, Korea, May 21-25, 2018.
Qualcomm Incorporated, "Remaining Details on QCL", R1-1804796, 3GPP TSG RAN WG1 Meeting #92bis, Sanya, China, Apr. 16-20, 2018.

* cited by examiner

METHOD AND APPARATUS FOR BEAM MANAGEMENT

CROSS-REFERENCE TO RELATED APPLICATION(S)

The present disclosure claims the benefit of and priority of provisional U.S. patent application Ser. No. 62/873,411, filed on Jul. 12, 2019, entitled "Beam management for NR Non-Terrestrial Network based on beam-fixed BWP" ("the '411 provisional"). The disclosure of the '411 provisional is hereby incorporated fully by reference into the present disclosure.

FIELD

The present disclosure is related to wireless communication, and more particularly, to a method for beam management in cellular wireless communication networks.

BACKGROUND

Various efforts have been made to improve different aspects of wireless communications, such as data rate, latency, reliability and mobility, for cellular wireless communication systems (e.g., fifth generation (5G) New Radio (NR)). NR supports beam management for enabling a high frequency band (e.g., millimeter wave frequency band) communication. To address higher pathloss in the high frequency band, a beamforming technique is adopted to provide additional gain, with the corresponding cost of a reduced spatial coverage for signal transmission/reception. To make up for the lost spatial coverage of beamforming, a beam is steered towards different directions in a time division multiplexing (TDM) manner so that, after a certain time period, a user equipment (UE) or a base station (BS) can further determine its environment with a desired spatial coverage.

Non-terrestrial networks (NTNs) refer to networks, or segments of networks, that use an airborne or spaceborne vehicle for transmission. Spaceborne vehicles include Low Earth Orbiting (LEO) satellites, Medium Earth Orbiting (MEO) satellites, Geostationary Earth Orbiting (GEO) satellites, and Highly Elliptical Orbiting (HEO) satellites. Airborne vehicles include High Altitude Platforms (HAPs) including Unmanned Aircraft Systems (UAS), such as Lighter than Air (LTA) UAS and Heavier than Air (HTA) UAS operating at altitudes typically between 8 and 50 km. Because beams and their associated coverage areas in an NTN have different characteristics than those in terrestrial cellular communication, there is a need in the industry for an improved and efficient mechanism for beam management in the NTN.

SUMMARY

The present disclosure is directed to a method for beam management performed by a UE in cellular wireless communication networks.

According to a first aspect of the present disclosure, a method for beam management performed by a UE is provided. The method includes: receiving a downlink control information (DCI) format in a first bandwidth part (BWP) based on a first quasi co-located (QCL) assumption specific to the first BWP, the DCI format scheduling a physical downlink shared channel (PDSCH) reception in a second BWP; receiving a radio resource control (RRC) configuration that includes a plurality of candidate transmission configuration indication (TCI) states associated with a serving cell in which the PDSCH is scheduled; receiving a medium access control (MAC) control element (CE) that indicates a subset of the plurality of candidate TCI states for activation in the second BWP; determining a second QCL assumption specific to the second BWP based on one TCI state in the subset; and receiving the PDSCH in the second BWP based on the second QCL assumption.

In an implementation of the first aspect, the MAC CE is received in the first BWP before receiving the DCI format scheduling the PDSCH in the second BWP.

In another implementation of the first aspect, a number of TCI states in the subset is one.

In another implementation of the first aspect, the second QCL assumption is determined based on a TCI state of the plurality of TCI states in the subset having a smallest index.

In another implementation of the first aspect, the second QCL assumption is identical to a third QCL assumption used for receiving a physical downlink control channel (PDCCH) in the second BWP.

In another implementation of the first aspect, the third QCL assumption corresponds to a control resource set (CORESET) associated with a monitored search space with a lowest CORESET identifier (ID) in a latest slot in which one or more CORESETs within the second BWP are monitored by the UE.

In another implementation of the first aspect, the third QCL assumption corresponds to a CORESET with a lowest CORESET ID within the second BWP.

Another implementation of the first aspect further comprises receiving a second RRC configuration that associates the first BWP with the first QCL assumption and associates the second BWP with the second QCL assumption.

In another implementation of the first aspect, the DCI format is received from a UE-group common signaling in which the DCI format is targeted to a plurality of UEs.

In another implementation of the first aspect, the DCI format and reception of the PDSCH are indicated as an NTN scenario.

According to a second aspect of the present disclosure, a UE for beam management is provided that includes one or more non-transitory computer-readable media containing computer-executable instructions embodied therein and at least one processor coupled to the one or more non-transitory computer-readable media. The at least one processor is configured to execute the computer-executable instructions to: receive a DCI format in a first BWP based on a first QCL assumption specific to the first BWP, the DCI format scheduling a PDSCH reception in a second BWP; receive an RRC configuration that includes a plurality of candidate TCI states associated with a serving cell in which the PDSCH is scheduled; receive a MAC CE that indicates a subset of the plurality of candidate TCI states for activation in the second BWP; determine a second QCL assumption specific to the second BWP based on one TCI state in the subset; and receive the PDSCH in the second BWP based on the second QCL assumption.

BRIEF DESCRIPTION OF THE DRAWINGS

Aspects of the present disclosure are best understood from the following detailed description when read with the accompanying drawings. Various features are not drawn to scale. Dimensions of various features may be arbitrarily increased or reduced for clarity of discussion.

DETAILED DESCRIPTION

Figure 1:
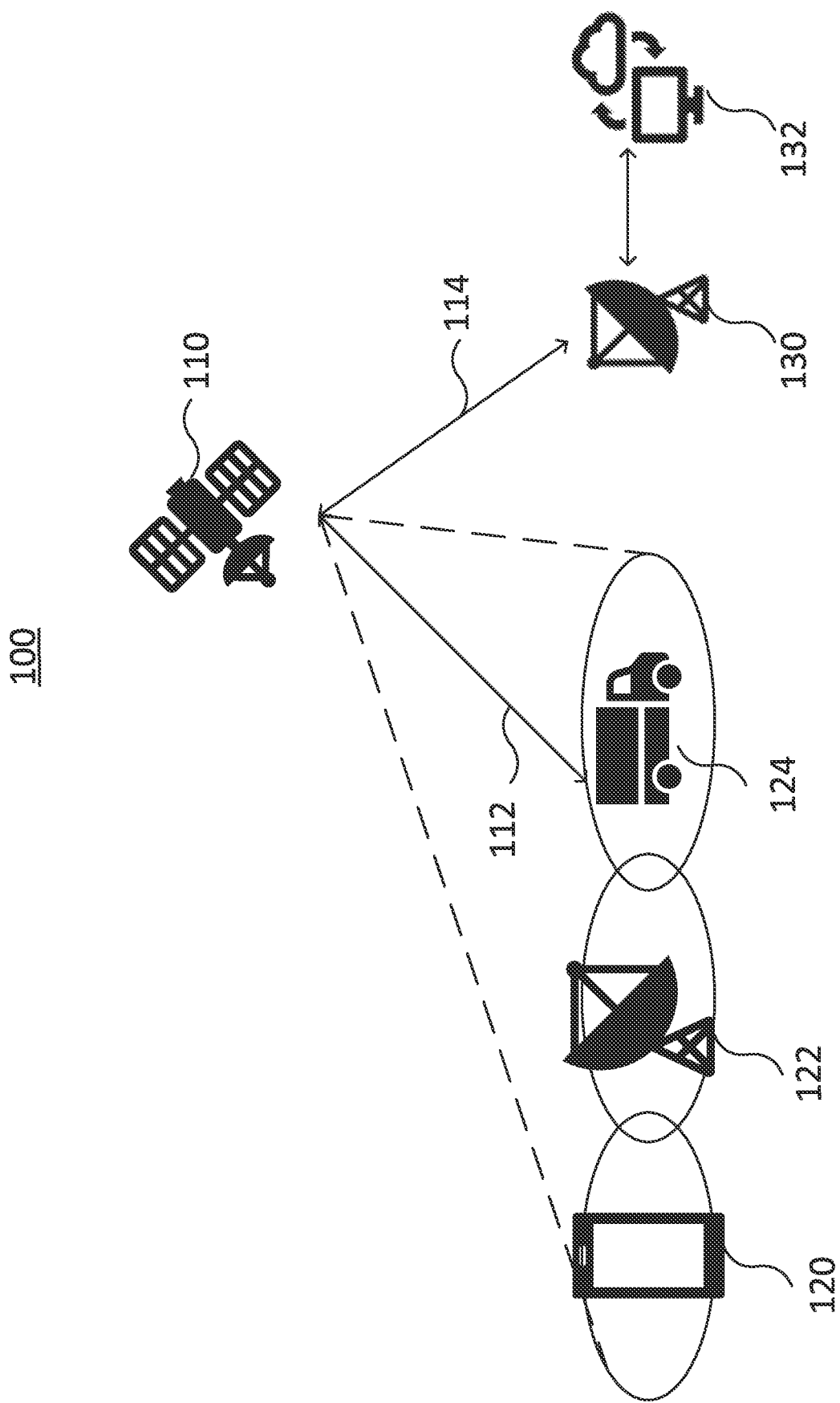
FIG. 1 is a diagram illustrating an example regenerative LEO satellite network according to an example implementation of the present disclosure.

The following description contains specific information related to implementations of the present disclosure. The drawings and their accompanying detailed description are merely directed to implementations.

However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the drawings. However, the features in different implementations may be different in other respects and shall not be narrowly confined to what is shown in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that multiple relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the present disclosure. In other examples, detailed description of well-known methods, technologies, systems, and architectures are omitted so as not to obscure the description with unnecessary details.

Persons skilled in the art will recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the present disclosure is directed to software installed and executing on computer hardware, alternative implementations as firmware or as hardware or combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, a ng-eNB in an E-UTRA BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the downlink (DL) and optionally uplink (UL) resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

When a transmission time interval (TTI) of a single NR frame includes DL transmission data, a guard period, and UL transmission data, the respective portions of the DL transmission data, the guard period, and the UL transmission data may be configured based on the network dynamics of NR. SL resources may also be provided in an NR frame to support ProSe services or V2X services.

Example descriptions of some selected terms used in this disclosure are given below.

Beam: the term "beam" used in this disclosure may be replaced by spatial filter. For example, when a UE reports a preferred BS (e.g., a gNB) transmission (TX) beam, the UE is essentially selecting a spatial filter used by the gNB. The term "beam information" is used to refer to information related to which beam/spatial filter is used/selected. In some implementations, individual reference signals are transmitted by applying individual beams (spatial filters). Thus, the term beam or beam information may be replaced by reference signal resource index(es).

Beam failure recovery: movements in the environment or other events may lead to a currently established beam pair being rapidly blocked without sufficient time for a regular beam adjustment to adapt based on a beam reporting mechanism (the beam reporting mechanism is similar to a channel state information (CSI) reporting mechanism that occurs in physical (PHY) channels). A beam failure recovery procedure is used to address such beam failure occurrences within a short reaction time.

Hybrid Automatic Repeat Request (HARQ): HARQ is a functionality that ensures delivery between peer entities at Layer 1 (i.e., Physical Layer). A single HARQ process supports one Transport Block (TB) when the physical layer is not configured for downlink/uplink spatial multiplexing, and a single HARQ process supports one or multiple TBs when the physical layer is configured for downlink/uplink spatial multiplexing. There is one HARQ entity per serving cell. Each HARQ entity supports a parallel (number) of DL and UL HARQ process.

Bandwidth Part (BWP): A subset of the total cell bandwidth of a cell is referred to as a BWP. Bandwidth Adaptation (BA) is achieved by configuring the UE with BWP(s) and indicating to the UE which of the configured BWPs is currently active. To enable BA on the Primary Cell (PCell), the gNB configures the UE with UL and DL BWP(s). To enable BA on Secondary Cells (SCells) in case of CA, the gNB configures the UE with at least DL BWP(s) (i.e., there may be no BWP in the UL). For the PCell, the initial BWP is the BWP used for initial access. For the SCell(s), the initial BWP is the BWP configured for the UE to first operate at the SCell activation. The UE may be configured with a first active uplink BWP by a firstActiveUplinkBWP information element (IE). If the first active uplink BWP is configured for a Special Cell (SpCell), the firstActiveUplinkBWP IE field contains the identifier (ID) of the UL BWP for activation upon performing RRC (re-)configuration. If the field is absent, the RRC (re-)configuration does not impose a BWP switch. If the first active UL BWP is configured for an SCell, the firstActiveUplinkBWP IE field contains the ID of the UL BWP for use upon MAC activation of an SCell.

Quasi Co-Location (QCL): Two antenna ports are said to be quasi co-located if properties of the channel over which a symbol on one antenna port is conveyed can be inferred from the channel over which a symbol on the other antenna port is conveyed. The "properties of the channel" may include Doppler shift, Doppler spread, average delay, delay spread, and spatial reception (RX) parameters. These properties are categorized into different QCL types in NR specifications. For example, QCL-TypeD refers to spatial RX parameter. QCL-TypeD is also referred to as "beam" in this disclosure.

TCI state: a TCI state contains parameters for configuring a QCL relationship between one or two DL reference signals and a target reference signal set. For example, a target reference signal set may be the demodulation reference signal (DM-RS) ports of a PDSCH or a physical downlink control channel (PDCCH).

Transparent GEO satellite network: a network architecture in which GEO satellites are transparent to UEs on the ground. Specifically, the GEO satellites are equipped with radio frequency (RF) components that amplify and forward RF signals to the served UEs. The RF signals are transmitted from a ground-based gNB and are forwarded to the UEs by the GEO satellite as a relay node.

LEO-based NTNs may include two network architecture options, a fixed beam and a moving beam. In the fixed beam architecture, each coverage area of satellite beams may be fixed in relation to earth. In contrast, in the moving beam architecture, satellite beams may not be steerable. The satellite beams may move with LEO satellites instead of tracking UEs. Each coverage area of satellite beams may move in relation to earth. The LEO based NTNs include two possible scenarios as transparent and regenerative LEO satellite networks, depending on equipped functions. A Transparent LEO satellite network refers to a relay-based NTN. Specifically, the LEO satellites simply perform amplify-and-forward in space.

Regenerative LEO satellite network refers to a network architecture in which LEO satellites have full functions of a gNB. Specifically, UEs on the ground are served directly by the satellites that orbit the Earth at a low altitude (e.g., from 600 km to 1200 km). The satellite is controlled and linked to an NTN Gateway on the ground that connects the satellite to the data network.

FIG. 1 is a diagram 100 illustrating an example regenerative LEO satellite network according to an example implementation of the present disclosure. As illustrated in FIG. 1, satellite 110 is a space-borne vehicle including a telecommunication transmitter. In this example, the satellite 110 may have the full functions of a base station. An antenna included in the satellite 110 may generate a satellite beam. A service link 112 is a radio link between the satellite 110 and serving UEs, which include a handheld device 120 (e.g., a cellphone), a very small aperture terminal (VSAT) 122, and a mounted device 124 (e.g., a vehicle). A feeder link 114 is a wireless link between the satellite 110 and an NTN gateway 130, which is an earth station for accessing the satellite 110. The NTN gateway 130 may be connected to a data network 132, such as 5G core network.

Figure 2:
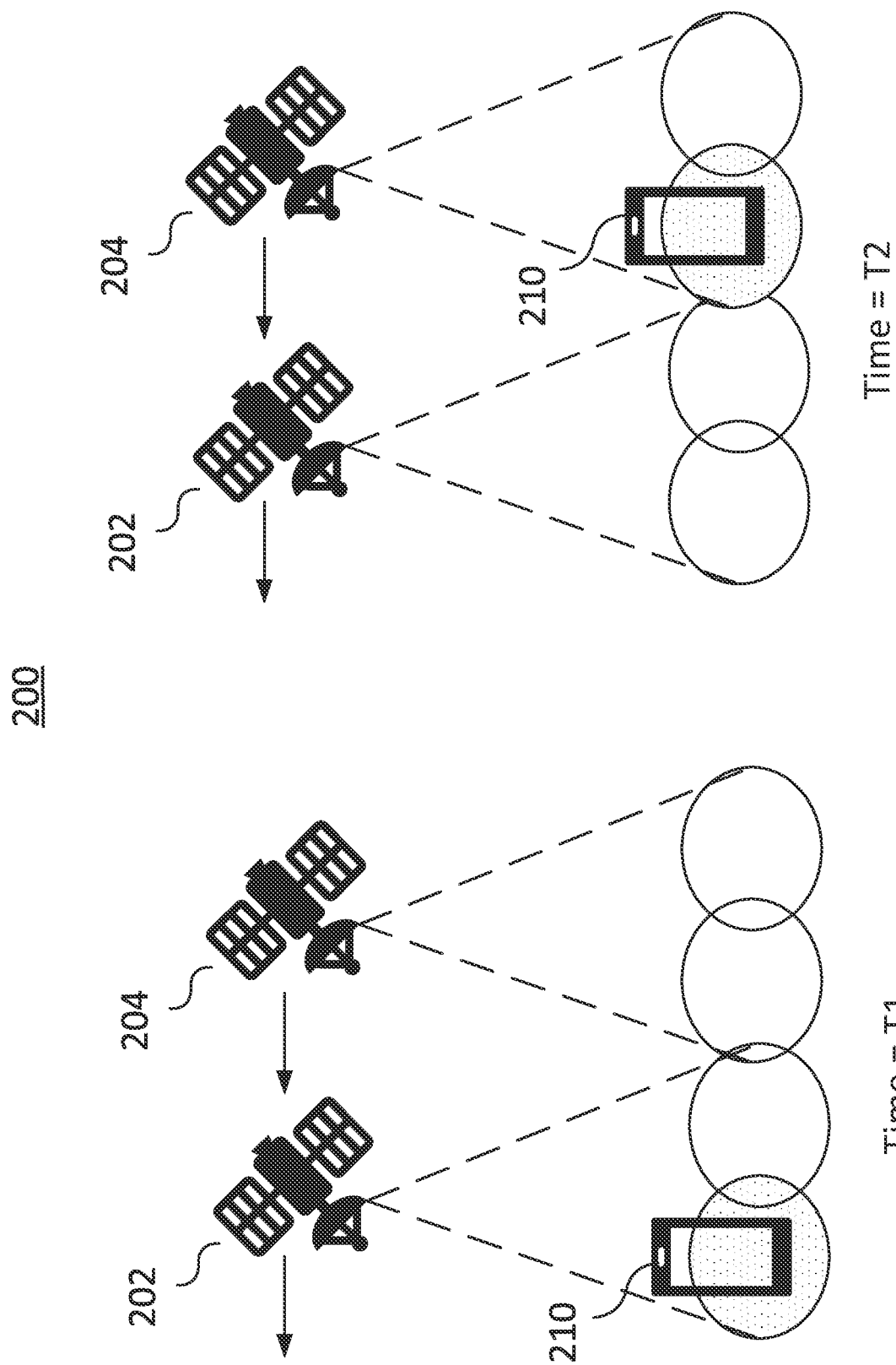
FIG. 2 is a diagram illustrating an example regenerative LEO satellite network with moving beams according to an example implementation of the present disclosure.

For a regenerative LEO satellite network with moving beams, LEO satellites constantly move with respect to a fixed point on earth, reaching speeds between 7-8 km/s depending on the orbital altitude. Specifically, within a serving cell, both stationary and moving UEs may need to change to a new beam constantly. FIG. 2 is a diagram 200 illustrating an example regenerative LEO satellite network with moving beams according to an example implementation of the present disclosure. In FIG. 2, arrows near satellite #1 202 and satellite #2 204 represent how the satellite #1 202 and satellite #2 204 move with respect to the earth ground. A UE 210 remains stationary in the example of FIG. 2. At time T1, the UE 210 is in the coverage area of the satellite #1 202. After the satellite #1 202 and satellite #2 204 move for a short period of time, at time T2, the UE 210 may be in the coverage area of the satellite #2 204. As illustrated in FIG. 2, a stationary UE may need to perform inter-beam handover and/or inter-satellite handover in a regenerative LEO satellite network with moving beams.

Figure 3A:
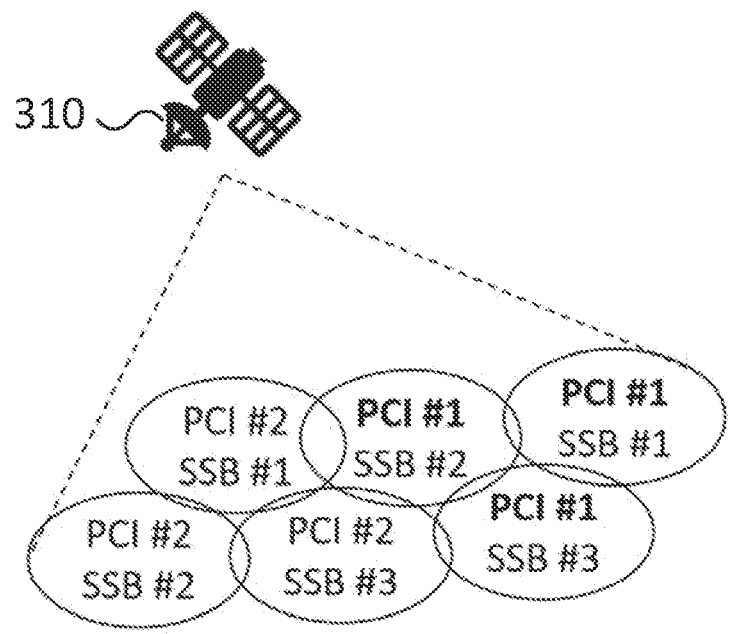
FIG. 3A is a diagram illustrating an example of an association between beams and cells according to an example implementation of the present disclosure.

In some implementations, an LEO satellite may provide multiple satellite beams (also referred to as spot beams). FIG. 3A is a diagram 300A illustrating an example of an association between beams and cells according to an example implementation of the present disclosure. As illustrated in FIG. 3, a satellite 310 provides multiple satellite beams, each of which is represented as an oval in FIG. 3A. A same Physical Cell Identity (PCI) may be associated with multiple satellite beams. For example, a cell having PCI #1 may be associated with beams Synchronization Signal Block (SSB) #1, SSB #2, and SSB #3.

Figure 3B:
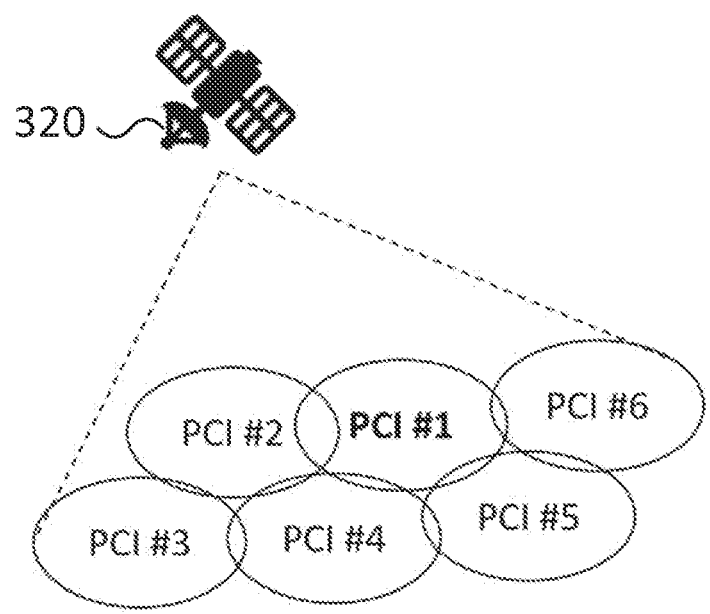
FIG. 3B is a diagram illustrating another example of an association between beams and cells according to an example implementation of the present disclosure.

FIG. 3B is a diagram 300B illustrating another example of an association between beams and cells according to an example implementation of the present disclosure. As illustrated in FIG. 3B, a satellite 320 provides multiple satellite beams, each of which is represented as an oval in FIG. 3B. In this example one PCI is associated with one satellite beam. As illustrated in FIG. 3B, six beams are associated with six different PCIs.

A baseline beam management scheme has been specified in 3GPP Rel-15 specifications, which has been tailored for terrestrial cellular communication. The beam management scheme may need to be modified to be properly applied in NTN scenarios as well. Several considerations as listed below are envisioned for an NTN.

In NTNs, an efficient beam change mechanism may be needed. The satellite parameters set with small beam diameter may be as small as 20 km for LEO-600 in a Ka-band. Based on this assumption, the available serving duration for each beam may be less than 3 seconds, given a satellite speed of 7.56 km/s and a UE speed of 1000 km per hour (i.e., 0.28 km/s).

Inter-beam interference (e.g., interference between satellite beams) may need to be alleviated or resolved. For alleviating the inter-beam interference, a frequency allocation pattern with a frequency reuse (FR) factor, such as 1, 3, 2 (if polarization re-use is enabled), etc., may be considered.

In some implementations, the concept of a BWP may be leveraged. A BWP refers to a small part of the full carrier bandwidth. For alleviating the inter-beam interference, one possibility is to introduce an association between a BWP and a beam. In some implementations, a base station (e.g., a gNB) may configure multiple non-overlapped BWPs and individual BWPs may be associated with individual satellite beams. For example, BWP #1 is associated with beam #1, BWP #2 is associated with beam #2, and so on. This beam-fixed BWP association may be configured to all UEs in a serving cell. When a UE moves to a new satellite beam, the gNB may trigger a DL command to change a satellite beam and a corresponding BWP simultaneously.

Figure 4:
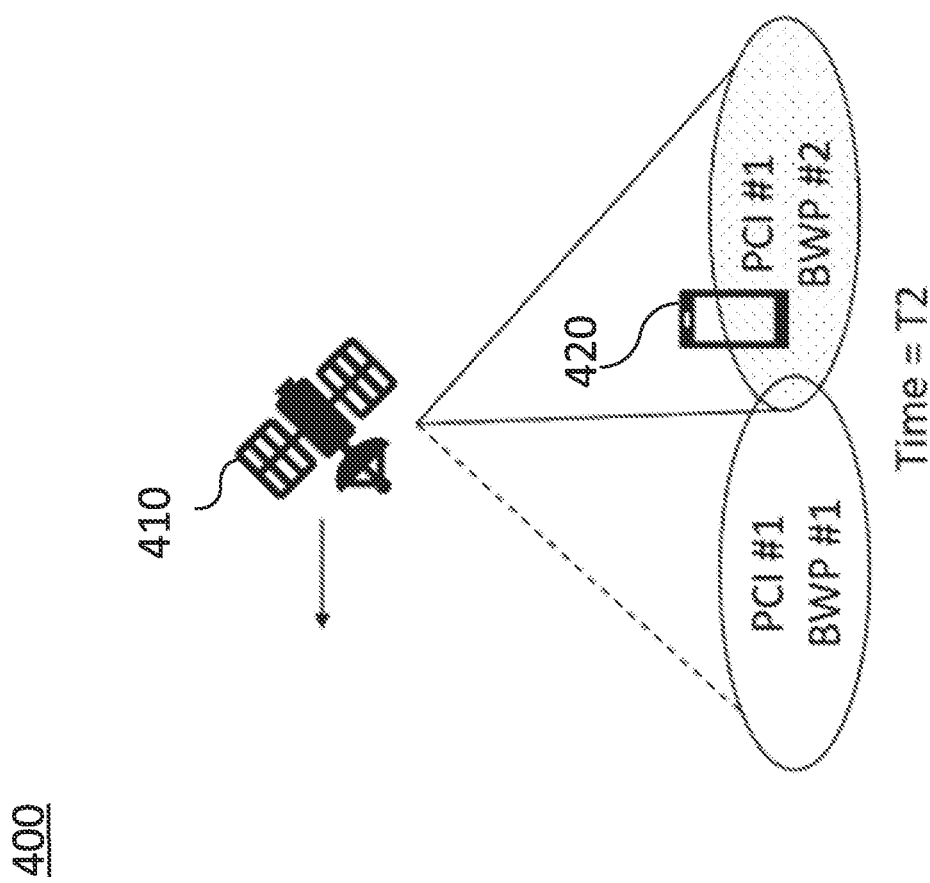
FIG. 4 is a diagram illustrating an example of a beam-fixed BWP switch according to an example implementation of the present disclosure.
Figure 4:
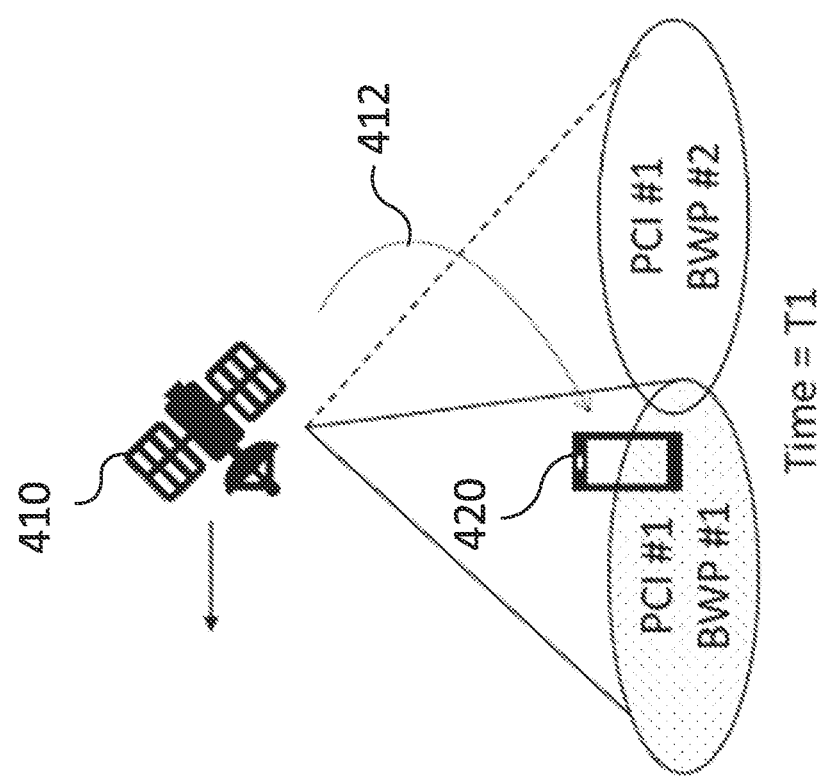

FIG. 4 is a diagram 400 illustrating an example of a beam-fixed BWP switch according to an example implementation of the present disclosure. As illustrated in FIG. 4, a satellite 410 provides multiple satellite beams and each beam is associated with a BWP. At time T1, an active BWP of the UE 420 is BWP #1. The satellite 410 may transmit a BWP switch command 412 to the UE 420. The UE 420 may update both BWP and satellite/UE beam information based on the BWP switch command 412. For example, the UE 420 may switch its active BWP from BWP #1 to BWP #2 and update the beam information correspondingly.

Several issues may arise in the beam-fixed BWP assumption.

Issue #1: a QCL assumption of a PDSCH may not be specified after a BWP switch indicated by a DCI format (e.g., DCI format 1_1) if a transmission configuration indication (TCI) field is absent in the DCI format.

It should be noted that the QCL assumption in this disclosure applies in general to all possible QCL types or a combination of them. The QCL types may be according to 3GPP Technical Specification (TS) 38.214. In some implementations, the QCL assumption may be a spatial QCL, such as QCL-typeD.

Figure 5:
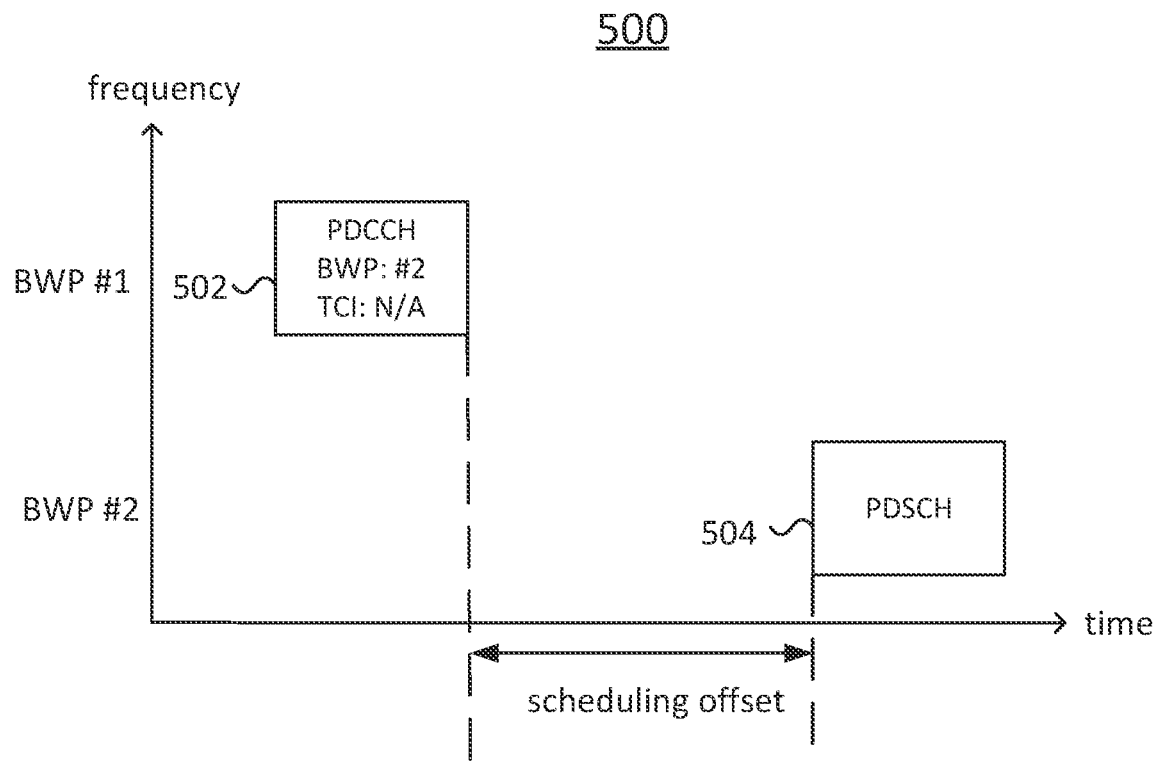
FIG. 5 is a diagram illustrating an example of a QCL assumption of a scheduled PDSCH according to an example implementation of the present disclosure.

FIG. 5 is a diagram 500 illustrating an example of a QCL assumption of a scheduled PDSCH according to an example implementation of the present disclosure. As illustrated in FIG. 5, a UE receives a PDCCH 502 in BWP #1 and the PDCCH 502 schedules a PDSCH 504 in BWP #2. In some implementations, a QCL assumption of the scheduling PDCCH 502 may be applied to the scheduled PDSCH 504 when a scheduling offset is larger than a threshold timeDurationQCL. Specifically, the UE may use the same QCL assumption (e.g., QCL-typeD) for receiving the PDCCH 502 and the PDSCH 504. The threshold timeDurationQCL may be the time needed by the UE to parse DCI in the PDCCH 502. For example, the UE may need at least timeDurationQCL to successfully obtain BWP and TCI information from the DCI in the PDCCH 502. As illustrated in FIG. 5, in the PDCCH 502, the TCI field is absent in the DCI and the DCI indicates to the UE to switch to BWP #2. The UE may apply the QCL assumption of the scheduling PDCCH 502 in BWP #1 as the QCL assumption of the scheduled PDSCH 504 in BWP #2. However, this contradicts the beam-fixed BWP assumption mentioned previously in which BWP #1 and BWP #2 are associated with different QCL assumptions.

Issue #2: a QCL assumption of a PDCCH after a BWP switch is not guaranteed to be known to the UE.

Figure 6:
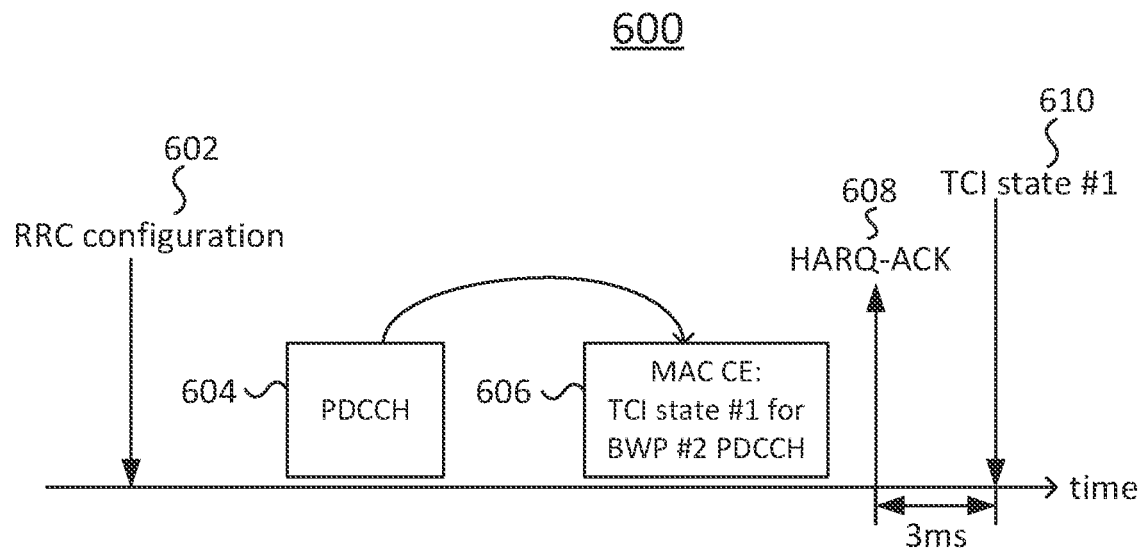
FIG. 6 is a diagram illustrating an example of a QCL assumption activation by a MAC CE according to an example implementation of the present disclosure.

FIG. 6 is a diagram 600 illustrating an example of a QCL assumption activation by a MAC CE according to an example implementation of the present disclosure. As illustrated in FIG. 6, the UE receives an RRC configuration 602 that indicates one or more TCI states for a PDCCH (e.g., a parameter Tci-StatesPDCCH in the RRC configuration). The UE later receives a PDCCH 604 in BWP #1 and the PDCCH 604 indicates a PDSCH containing a MAC CE 606 that includes an activation command for activating a QCL assumption for PDCCH monitoring in BWP #2. For example, the MAC CE 606 activates TCI state #1 that is configured in the received RRC configuration 602. Further in FIG. 6, the UE transmits a HARQ-ACK 608 in response to the PDSCH containing the MAC CE command. The activated QCL assumption is effective 3 ms after the HARQ-ACK. Further, in FIG. 6, the UE applies TCI state #1 610 (which is activated by the MAC CE 606) for receiving a PDCCH in BWP #2 if an active BWP of the UE is switched to BWP #2. As illustrated in FIG. 6, a QCL assumption for a control resource set (CORESET)/PDCCH on a new BWP may be activated beforehand (e.g., the UE may apply TCI state #1 610 activated by the MAC CE 606 before receiving a PDCCH in BWP #2). However, such behaviour is not guaranteed in 3GPP TS Rel-15.

Additionally, in the NTN scenario, group-based signalling may be introduced for optimizing signalling overhead. In an NTN, the existence of static yet clustered terminals provides a use case for group-based control on the terminals (such as VSATs).

Case 1: Default QCL Assumption for PDSCH During BWP Switch

Figure 7:
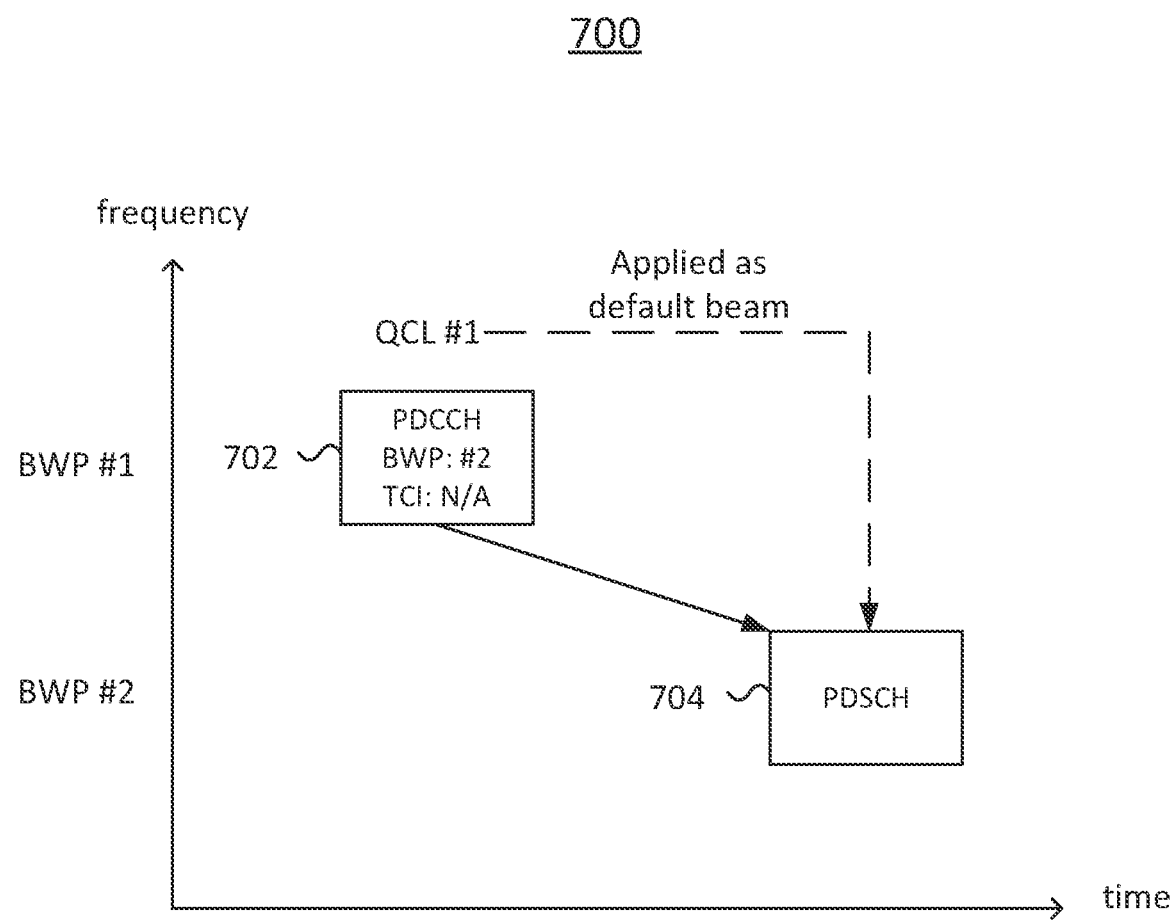
FIG. 7 is a diagram illustrating an example of a QCL assumption issue for a PDSCH during a BWP switch according to an example implementation of the present disclosure.

FIG. 7 is a diagram 700 illustrating an example of a QCL assumption issue for a PDSCH during a BWP switch according to an example implementation of the present disclosure. As illustrated in FIG. 7, PDCCH 702 in BWP #1 indicates a BWP switch to BWP #2 and schedules PDSCH 704 in BWP #2. A time offset between PDCCH 702 and PDSCH 704 is greater than a BWP switch latency. The BWP switch latency may refer to a time period that the UE takes to switch from one active BWP to another active BWP. In some implementations, the BWP switch latency may refer to a minimum time period required for switching from one BWP to another BWP.

In some implementations, a QCL assumption for PDSCH 704 in BWP #2 may follow a QCL assumption of the scheduling PDCCH 702 in BWP #1 (e.g., QCL #1). However, under the assumption of a bundled pair of {BWP, QCL} (e.g., BWP #1 and BWP #2 are associated with different QCL assumptions), the behaviour that involves such cross-BWP beam reference as illustrated in FIG. 7 may not be allowed.

A Dynamic BWP switch may be indicated via a DCI format (e.g., DCI format 1_1). Further, indication of whether a TCI field is present in the DCI format may be configurable via an RRC parameter (e.g., Tci-PresentInDCI). When the TCI field is not configured as present in the DCI format, a default beam issue illustrated in FIG. 7 may exist.

Case 1-1: Assuring TCI Presence in Scheduling DCI During BWP Switch

Figure 8:
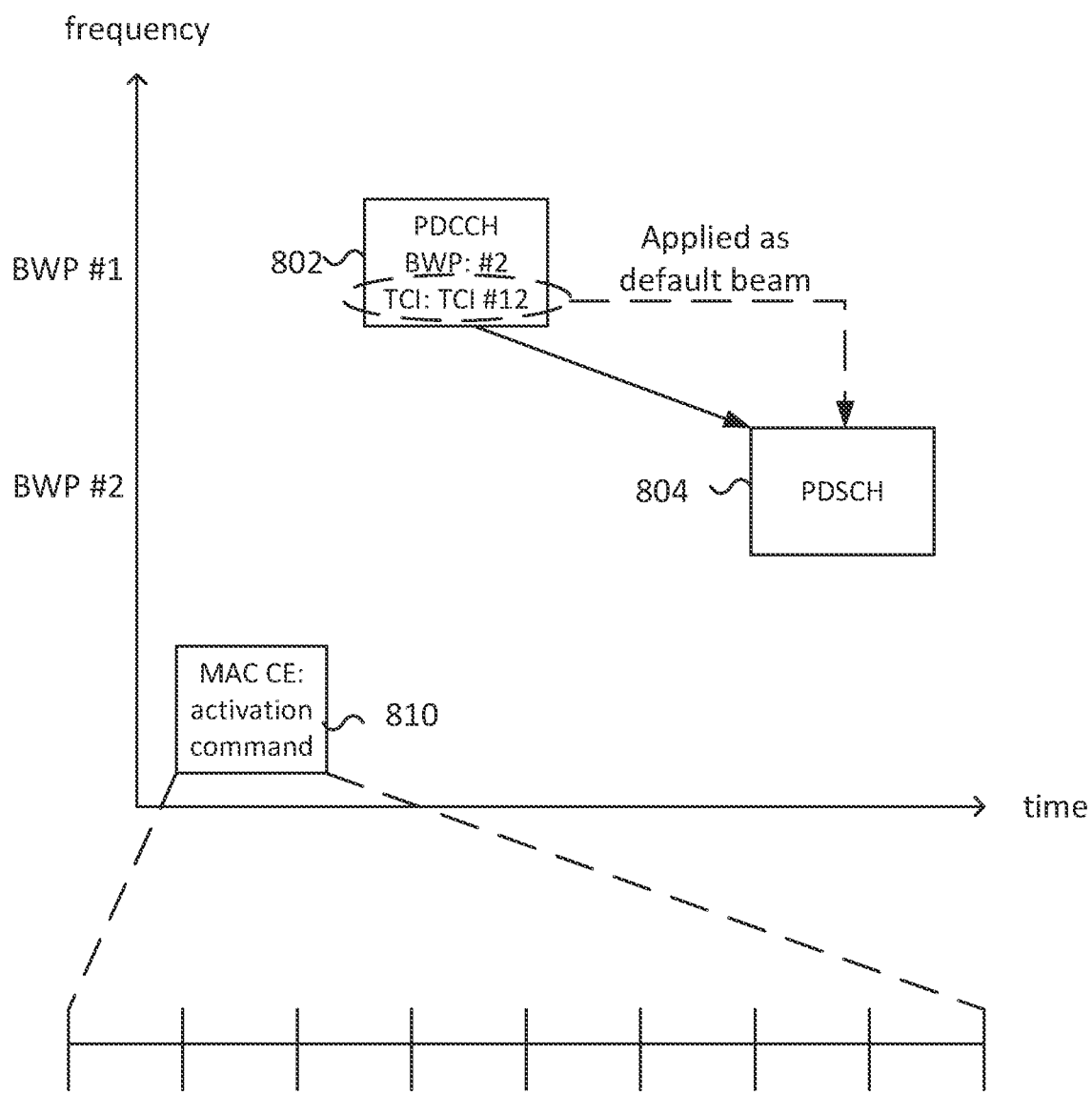
FIG. 8 is a diagram illustrating an example of a DCI format that includes a TCI field and indicates a BWP switch according to an example implementation of the present disclosure.

In some implementations, the above-mentioned issue may be avoided by assuring the presence of the TCI field in a DCI format that triggers a BWP switch. FIG. 8 is a diagram 800 illustrating an example of a DCI format that includes a TCI field and indicates a BWP switch according to an example implementation of the present disclosure.

As illustrated in FIG. 8, a PDCCH 802 in BWP #1 indicates a BWP switch to BWP #2 and schedules PDSCH 804 in BWP #2. A time offset between PDCCH 802 and PDSCH 804 is greater than a BWP switch latency. The UE may receive a MAC CE 810 in a PDSCH as an activation command for activating a subset of TCI states for BWP #2. In some implementations, the MAC CE 810 may be received by the UE before receiving PDCCH 802 and PDSCH 804. In some implementations, the MAC CE 810 may be received in BWP #1 or BWP #2. It should be noted that the reception of the PDSCH MAC CE 810 as an activation command may also be in an active BWP other than BWP #2 or BWP #1, as illustrated in FIG. 8.

The MAC CE 810 may include multiple octets (e.g., each octet having 8 bits). As illustrated in FIG. 8, octet (Oct) 1 includes a reserved bit R, a serving cell ID (e.g., 5 bits), and a BWP ID (e.g., 2 bits). Oct 2 and Oct 3 include a bitmap for indicating which TCI state(s) is/are activated. In some implementations, each bit in the bitmap may indicate an activation/deactivation state of one TCI state. The bitmap includes 16 bits in the example illustrated in FIG. 8, but it should be noted that the bitmap may include more or less bits in other implementations.

The PDCCH 802 includes a TCI field that indicates which TCI state in the activated subset for BWP #2 is applied as a QCL assumption for receiving the PDSCH 804. For example, if the MAC CE 810 activates a subset of TCI states for BWP #2, the subset including TCI state #12 (e.g., the bit value of T12 equal to '1') and the PDCCH 802 includes a TCI field that indicates TCI state #12, the TCI state #12 may be applied as the QCL assumption in BWP #2 for receiving the PDSCH 804 scheduled by the PDCCH 802.

Case 1-1-1: UE Expects a TCI Field in a DCI Format that Triggers a BWP Switch at Least for an NTN Scenario.

In some implementations, the presence of the TCI field may be implemented by a network (NW) based on whether a ground base station or a satellite base station is present. For example, a gNB may configure the TCI field in the DCI format if the gNB is a satellite gNB.

In some implementations, an RRC parameter for indicating whether the TCI field is present in the DCI (e.g., Tci-PresentInDCI) may always be configured as true (or enabled) if a BWP switch is triggered by a DCI format.

In some implementations, the presence of the TCI field may be indicated to the UE by signaling. The UE may expect the TCI field in the DCI after receiving such signaling. When the presence of the TCI field is not signalled to the UE, the UE may assume that the TCI field in the DCI is determined by an RRC parameter Tci-PresentInDCI.

In some implementations, the TCI state indicated by the TCI field in the DCI may refer to one of the activated TCI states in an activated BWP. Referring to the example illustrated in FIG. 8, the TCI state indicated by the PDCCH 802 may correspond to one of the TCI states activated in BWP #2 by the MAC CE 810.

Other details related to beam indication may follow principles specified in 3GPP specifications, for example, the V15.5.0 series.

Case 1-1-2: UE Expects a TCI Field When Receiving a DCI Format That Triggers a BWP Switch but the TCI Field is Absent or Invalid in the DCI Format.

In some implementations, a TCI field may be invalid if its value does not correspond to an activated TCI state. Referring to the example illustrated in FIG. 8, the TCI field may be invalid if the TCI field in the PDCCH 802 indicates TCI state #12 but the MAC CE 810 does not activate TCI state #12 (e.g., the bit value of T12 equal to '0').

In some implementations, the UE may ignore the DCI format with no further action when the TCI field is absent/invalid in the DCI format.

In some implementations, the UE may perform the BWP switch indicated by the DCI format (e.g., PDCCH 802) and initiate a random access procedure in the new BWP (e.g., BWP #2) when the TCI field is absent/invalid. The UE may regain beam alignment in the new BWP after the random access procedure. The reception of a PDSCH (e.g., PDSCH 804 in FIG. 8) scheduled by the DCI may depend on UE implementation. If the UE determines to receive the PDSCH, the QCL assumption taken by the UE for receiving the PDSCH is also according to UE implementation. In some implementations, the random access procedure in the new BWP may be a contention-based random access (CBRA) procedure.

In some implementations, the UE may perform the BWP switch and initiate/perform a beam failure recovery (BFR) procedure in new BWP (e.g., BWP #2 in FIG. 8) when the TCI field is absent/invalid. The BFR procedure may be performed by initiating a random access procedure or by other means, such as via a PUCCH (e.g., a scheduling request) or via a PUSCH (e.g., MAC CE). The UE may regain beam alignment in the new BWP after the BFR procedure. The reception of a PDSCH scheduled by the DCI may depend on UE implementation. If the UE determines to receive the PDSCH, the QCL assumption taken by the UE for receiving the PDSCH is also according to UE implementation.

Figure 9:
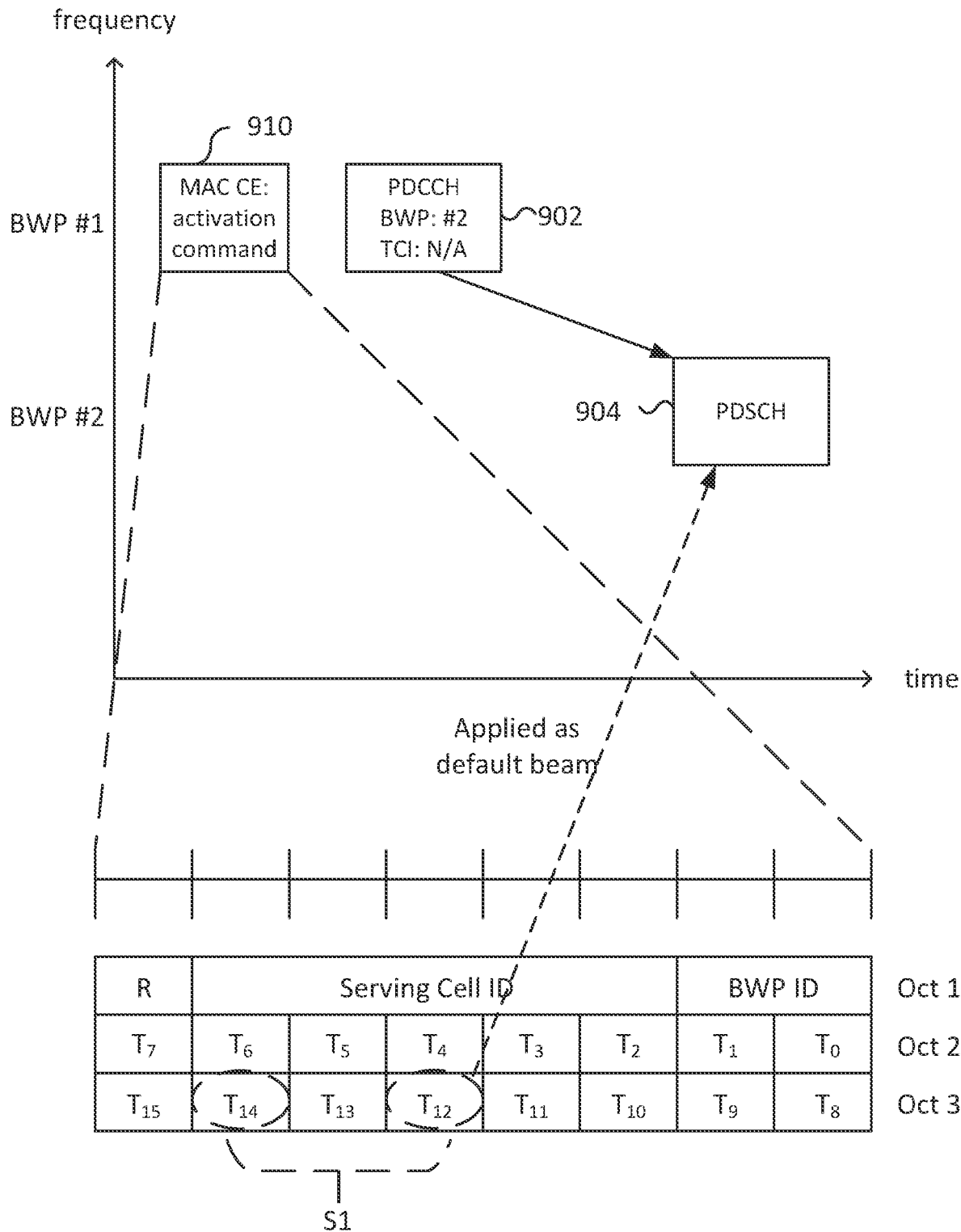
FIG. 9 is a diagram illustrating an example of a method for determining a QCL assumption during a BWP switch according to an example implementation of the present disclosure.

Case 1-2: Taking One of the Activated TCI States as a Default QCL Assumption for a PDSCH During a BWP Switch FIG. 9 is a diagram 900 illustrating an example of a method for determining a QCL assumption during a BWP switch according to an example implementation of the present disclosure. As illustrated in FIG. 9, a PDCCH 902 in BWP #1 indicates a BWP switch to BWP #2 and schedules PDSCH 904 in BWP #2. A time offset between PDCCH 902 and PDSCH 904 is greater than a BWP switch latency. The TCI field is absent in PDCCH 902. The UE may receive a MAC CE 910 in a PDSCH as an activation command for activating a subset of TCI states for BWP #2. The MAC CE 910 may be received by the UE before receiving PDCCH 902 and/or PDSCH 904. In the example illustrated in FIG. 9, the MAC CE 910 is received in BWP #1. In other implementations, the MAC CE 910 may be received in BWP #2, or a BWP other than BWP #1 and BWP #2.

In some implementations, one of the TCI states activated by the MAC CE 910 may be predetermined/configured/preconfigured as a default QCL assumption of PDSCH 904. For example, the UE may choose one of the activated TCI states based on a predetermined rule, such as choosing the TCI state that has the smallest index, the TCI state that has the largest index, or the TCI state that has a specific index that is configured/preconfigured via RRC signaling.

In some implementations, the UE may apply one of the activated TCI states as the default beam for receiving PDSCH 904 when PDCCH 902 does not provide QCL assumption of reception of PDSCH 904 in BWP#2. In some implementations, the MAC CE 910 may be received in an active BWP other than BWP#2.

In some implementations, the MAC CE 910 indicates a subset S1 of TCI states for activation. The UE may determine the QCL assumption for PDSCH 904 based on one TCI state in the subset S1. In some implementations, the MAC CE 910 for the PDSCH QCL assumption may use a format specified in 3GPP TS Rel-15.

In some implementations, the number of TCI states in the subset S1 is equal to one. Specifically, the MAC CE 910 indicates only one TCI state for activation. The UE may apply this activated TCI state as the QCL assumption for receiving PDSCH 904. In some implementations, the UE may apply this activated TCI state irrespective of the TCI field indication. For example, the UE may apply the only TCI state activated by the MAC CE 910 even if the PDCCH 902 includes a TCI field indication. In some implementations, the UE may apply this activated TCI state irrespective of a PDCCH beam when the TCI field is not provided. For example, the UE may apply the only TCI state activated by the MAC CE 910 as the QCL assumption for PDSCH 904 irrespective of a PDCCH beam in BWP #2.

In some implementations, the number of TCI states in the subset S1 is greater than one. The UE may select one of the activated TCI states as the QCL assumption for receiving PDSCH 904. In some implementations, the activated TCI states with the smallest index may be selected as the default QCL assumption. As illustrated in FIG. 9, the subset S1 activated by the MAC CE 910 includes TCI state #12 and TCI state #14. The UE may select TCI state #12 (which has the smallest index in the subset S1) as the default QCL assumption for reception of PDSCH 904 in BWP #2.

In some implementations, the PDSCH QCL assumption may be applied after a BWP switch, but before PDCCH default beam principles on the same BWP are applicable. As illustrated in FIG. 9, the QCL assumption for PDSCH 904 in BWP #2 may be applied after switching to BWP #2 but before a PDCCH default beam on BWP #2 is applicable.

In some implementations, the PDSCH QCL assumption may be applied unless otherwise indicated. For example, the PDSCH QCL assumption may be applied until receiving another MAC CE that activates multiple TCI states and another DCI format that indicates one of the activated TCI states if the number of originally activated TCI states is one.

Figure 10:
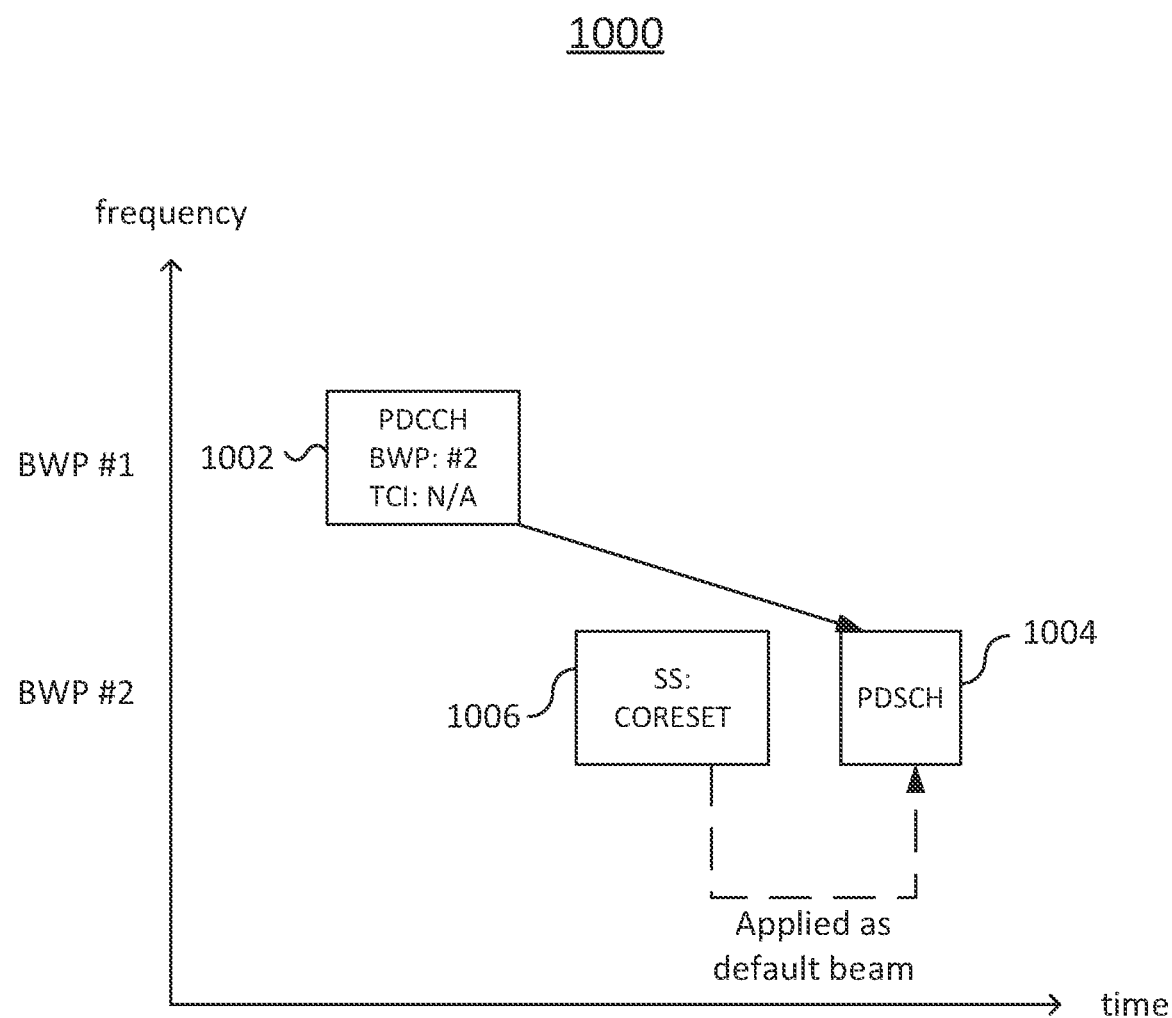
FIG. 10 is a diagram illustrating an example of a scenario in which a PDCCH QCL assumption is used as a PDSCH QCL assumption according to an example implementation of the present disclosure.

Case 1-3: Taking PDCCH QCL Assumption in a
New BWP as a Default PDSCH QCL Assumption FIG. 10 is a diagram 1000 illustrating an example of a scenario in which a PDCCH QCL assumption is used as a PDSCH QCL assumption according to an example implementation of the present disclosure. As illustrated in FIG. 10, a PDCCH 1002 in BWP #1 indicates a BWP switch to BWP #2 and schedules a PDSCH 1004 in BWP #2. A time offset between PDCCH 1002 and a search space (SS) 1006 monitored for a PDCCH in BWP #2 is greater than a BWP switch latency. The TCI field is absent in PDCCH 1002.

In some implementations, the QCL assumption of PDSCH 1004 of a serving cell after the BWP switch triggered PDCCH 1002 may follow the QCL parameter(s) used for receiving the PDCCH in the monitored SS 1006. Specifically, the QCL assumption of the PDSCH 1004 in BWP #2 may be identical to the QCL assumption of the PDCCH 1002 in BWP #2.

In some implementations, the QCL assumption of the PDSCH after the BWP switch may follow the QCL parameter(s) used for PDCCH QCL indication of the CORESET associated with a monitored search space with the lowest CORESET ID in the latest slot in which one or more CORESETs within the active BWP (e.g., BWP #2 in FIG. 10) of the serving cell are monitored by the UE.

In some implementations, the QCL assumption of the PDSCH after the BWP switch may follow the QCL parameter(s) used for the PDCCH QCL indication that corresponds to a CORESET with a lowest CORESET ID within the active BWP (e.g., BWP #2 in FIG. 10).

Case 1-4: Introducing an RRC Configuration to
Bundle a {BWP, QCL} Pair

In some implementations, an RRC parameter may be introduced to provide a QCL assumption for each BWP. In this RRC-based approach, when a beam indication command is received, an accompanying BWP switch may take place accordingly.

Figure 11:
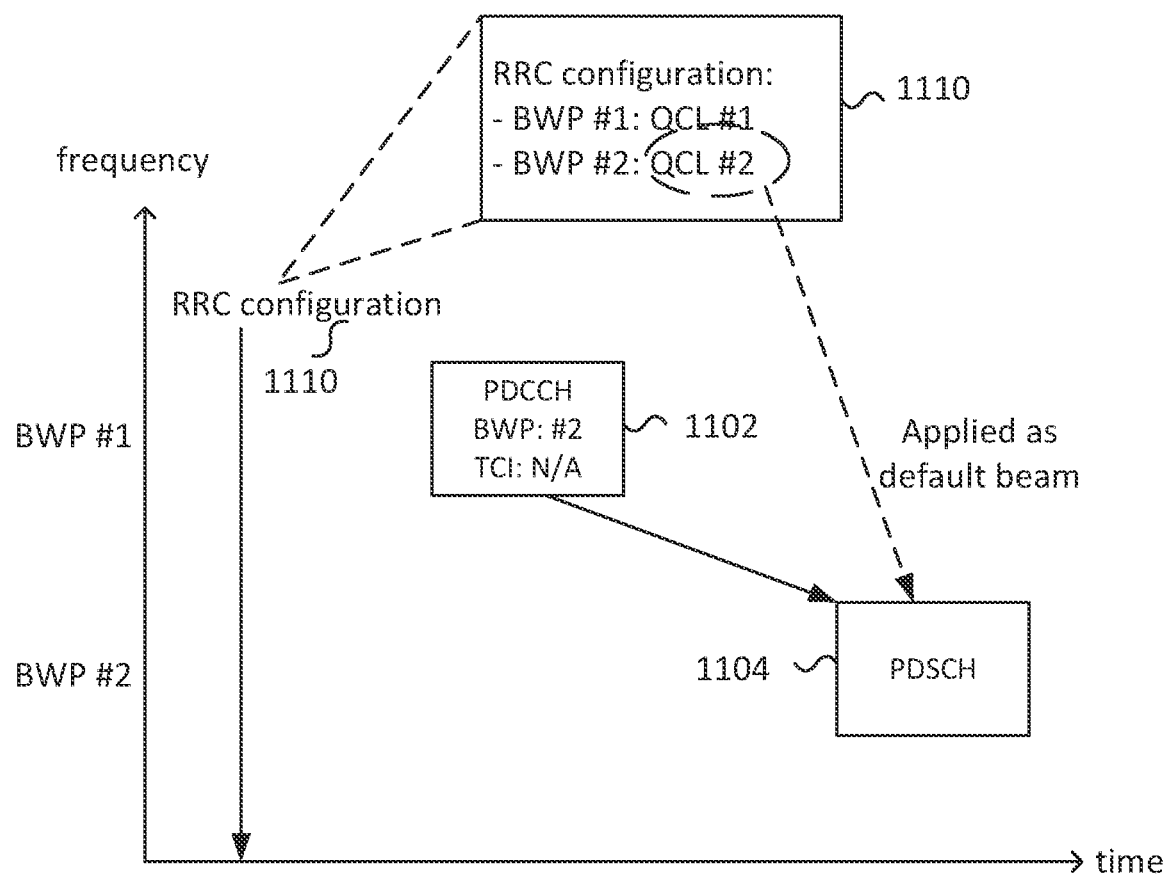
FIG. 11 is a diagram illustrating an example of an RRC configuration that bundles a {BWP, QCL} pair according to an example implementation of the present disclosure.

Case 1-4-1: Introduce a BWP-Specific RRC
Configuration to Bundle a {BWP, QCL} Pair FIG. 11 is a diagram 1100 illustrating an example of an RRC configuration that bundles a {BWP, QCL} pair according to an example implementation of the present disclosure. As illustrated in FIG. 11, a PDCCH 1102 in BWP #1 indicates a BWP switch to BWP #2 and schedules PDSCH 1104 in BWP #2. A time offset between PDCCH 1102 and PDSCH 1104 is greater than a BWP switch latency. The TCI field is absent in PDCCH 1102. The UE receives an RRC configuration 1110 to configure QCL assumptions for individual BWPs. The RRC configuration 1110 associates BWP #1 with QCL assumption #1 and associates BWP #2 with QCL assumption #2. Individual BWPs may be provided with individual QCL assumptions. In this implementation, transmission in each BWP (including both the control channel and the data channel) may be bound by a corresponding QCL assumption. In some implementations, the QCL reference may be provided via TCI states.

In some implementations, the RRC configuration 1110 may be provided together with a BWP configuration. In some implementations, only one set of QCL assumptions (e.g., one TCI state) is provided for each configured BWP. The UE may determine a QCL assumption for the reception of the PDSCH during a BWP switch based on a BWP-specific QCL assumption provided in the RRC configuration 1110. As illustrated in FIG. 11, QCL #2 may be applied for reception of the PDSCH 1104 in BWP #2.

In some implementations, QCL assumption in the RRC configuration 1110 may be applied directly without further signaling such as an activation command in a MAC CE. In some implementations, if the per-BWP RRC parameter is applied (e.g., RRC configuration 1110), other beam indication signaling may not be required and may be ignored if provided.

In some implementations, the UE may receive the QCL assumption for individual BWPs via RRC signaling after an initial access or after/accompanied by a handover command. In some implementations, a MAC CE for activation for the configured default QCL assumption may not be required. In some implementations, the configured QCL assumption may be activated/deactivated directly when the associated BWP is activated/deactivated.

In some implementations, the configured QCL assumption may be applicable to both the PDCCH and PDSCH. In some implementations, the configured QCL assumption may be applicable to the PDSCH only.

In some implementations, the UE does not expect Tci-PresentInDCI to be configured and, therefore, the TCI field is not present in scheduling DCIs.

Case 1-4-2: Reusing an Existing RRC Parameter to
Provide a BWP-QCL Association

In some implementations, an existing RRC parameter may be reused to provide a BWP-QCL association. The application of the reused parameter for the association may be subject to a new condition. In some implementations, the "new condition" may include an NTN scenario. For example, the BWP-QCL association configured by the RRC parameter may be applied when the UE identifies the NTN scenario. The NTN scenario may be signaled to the UE. In some implementations, the NTN scenario may be signaled via another RRC parameter or a DCI format.

In some implementations, a bwp-Id field in a QCL-Info IE may be used to indicate a BWP associated with a QCL assumption. In some implementations, when a channel state information reference signal (CSI-RS) is configured as referenceSignal in the QCL Info IE and its corresponding TCI state is indicated as a QCL reference for a PDSCH, the UE may assume that the active BWP is the same as the BWP indicated by the bwp-Id field.

In some implementations, the previous disclosed principle may also be applicable for an SSB. Specifically, both an SSB and CSI-RS may be configured with the bwp-Id parameter. When the SSB is configured as referenceSignal in the QCL-Info IE and its corresponding TCI state is indicated as a QCL reference for a PDSCH, the UE may assume that the active BWP is the same as the BWP indicated by the bwp-Id parameter. In some implementations, an association between the BWP and QCL assumption is applied for an SSB. Specifically, when the CSI-RS is used as referenceSignal, its corresponding bwp-Id is not assumed as the active BWP.

In some implementations, the BWP-QCL association in case 1-4-2 may be applied to either a PDSCH or PDCCH QCL determination. In some implementations, the BWP-QCL association in case 1-4-2 may be applied to both the PDSCH and PDCCH.

Case 2: Default QCL Assumption for a PDCCH During a BWP Switch

Figure 12:
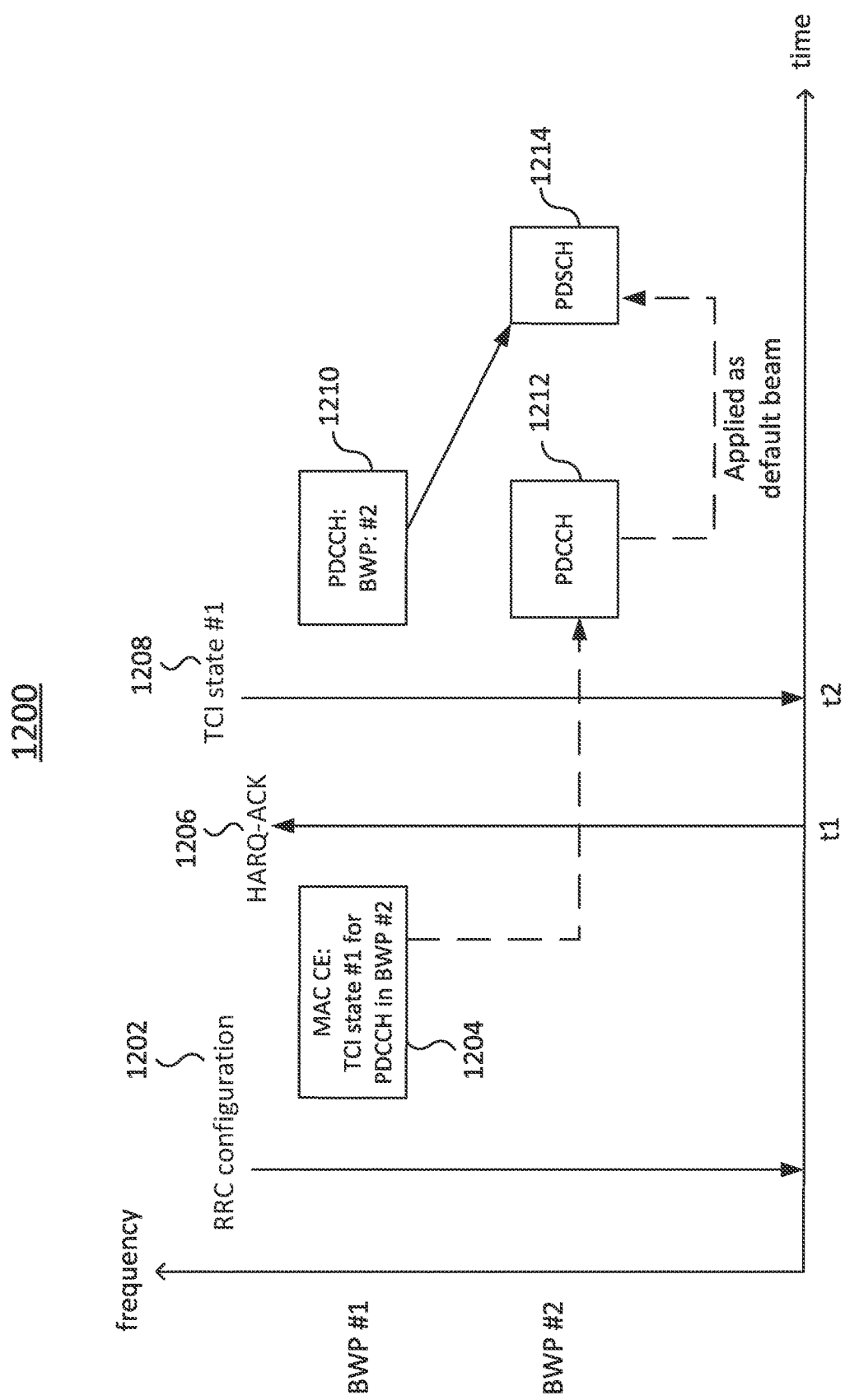
FIG. 12 is a diagram illustrating an example of a QCL assumption issue for a PDCCH during a BWP switch according to an example implementation of the present disclosure.

FIG. 12 is a diagram 1200 illustrating an example of a QCL assumption issue for a PDCCH during a BWP switch according to an example implementation of the present disclosure. As illustrated in FIG. 12, the UE receives an RRC configuration 1202 that indicates one or more TCI states for a PDCCH (e.g., a parameter Tci-StatesPDCCH in the RRC configuration). The UE receives a PDCCH 1210 in BWP #1. The PDCCH 1210 indicates a BWP switch to BWP #2 and schedules a PDSCH 1214 in BWP #2. The UE receives a MAC CE 1204 that includes an activation command for activating a QCL assumption for the PDCCH 1212 in BWP #2. For example, the MAC CE 1204 activates TCI state #1 for the PDCCH 1212 in BWP #2. As further illustrated in FIG. 12, the UE transmits a HARQ-ACK 1206 at time t1 in response to the PDSCH containing the MAC CE command. As further illustrated in FIG. 12, the UE applies TCI state #1 1208 for the PDCCH 1212 in BWP #2 at time t2. The time difference between time t1 and time t2 is a MAC CE latency. The QCL assumption activated by the MAC CE 1204 may be effective after the MAC CE latency (e.g., 3 ms) after transmitting the HARQ-ACK. In some implementations, the QCL assumption for receiving the PDCCH 1212 may be applied as the QCL assumption for receiving the PDSCH 1214 as well.

As illustrated in FIG. 12, a proper operation of receiving the PDCCH 1212 in BWP #2 after the BWP switch relies on the assumption that a valid TCI state (e.g., TCI state #1) for BWP #2 is activated beforehand. Specifically, application of TCI state #1 1208 for PDCCH 1212 in BWP #2 takes place before receiving the PDCCH 1212. However, this is based on NW implementation and such behaviour is not guaranteed. Implementations are provided below to address the issue illustrated in FIG. 12.

Case 2-1: UE Behaviour if No Active QCL is Provided

In some implementations, the issue illustrated in FIG. 12 may be resolved by requiring the NW to provide such information (e.g., a TCI state to be activated) or to clearly define UE behaviour if such information is not provided when needed.

In some implementations, the UE may expect a TCI state is activated for at least a CORESET of a BWP in a serving cell before receiving a DCI that activates the BWP in the serving cell. The MAC CE as an activation command for the PDCCH QCL assumption may reuse the MAC CE specified in 3GPP TS. In some implementations, mandatory activation of a TCI state may be indicated to the UE by signaling.

In some implementations, if there is no activated QCL assumption of any CORESET(s) in the search spaces of an activated BWP of a UE, the UE may (a) ignore the DCI that indicates a BWP switch with no further action, (b) perform a BWP switch and initiate a random access procedure in the new BWP, or (c) perform a BWP switch and initiate a BFR procedure in the new BWP. In some implementations, the random access procedure may be a CBRA procedure.

Case 2-2: Introducing an RRC Configuration to Bundle a {BWP, QCL} Pair

In some implementations, an RRC parameter may be used to provide a QCL assumption for each BWP. In this RRC-based approach, when a beam indication command is received, an accompanying BWP switch may take place accordingly.

Figure 13:
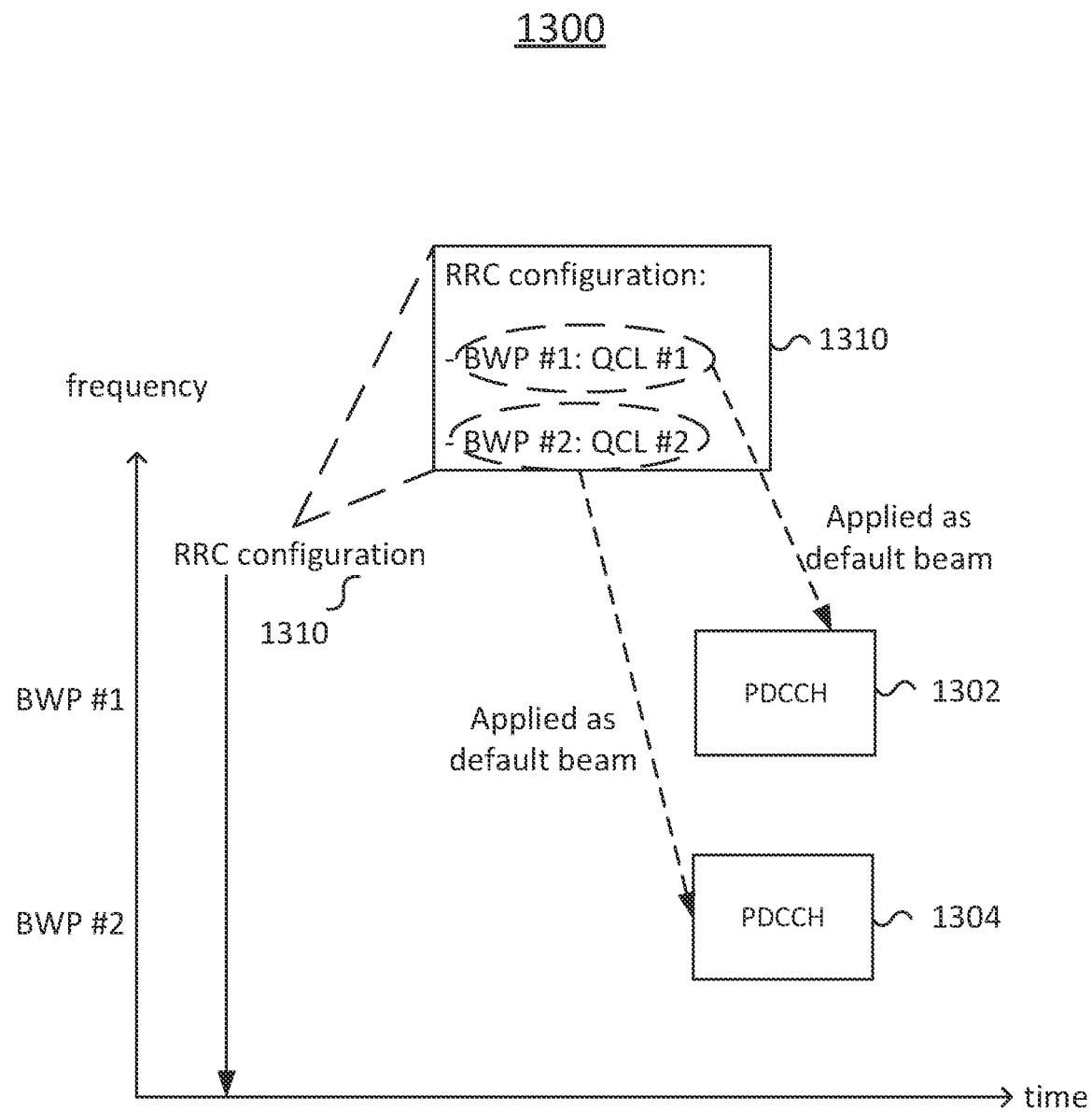
FIG. 13 is a diagram illustrating an example of an RRC configuration that bundles a {BWP, QCL} pair according to an example implementation of the present disclosure.

FIG. 13 is a diagram 1300 illustrating an example of an RRC configuration that bundles a {BWP, QCL} pair according to an example implementation of the present disclosure. As illustrated in FIG. 13, a UE receives an RRC configuration 1310 to configure QCL assumptions for individual BWPs. The RRC configuration 1310 associates BWP #1 with QCL assumption #1 and associates BWP #2 with QCL assumption #2.

In some implementations, the RRC configuration 1310 may be provided together with a BWP configuration. In some implementations, only one QCL assumption (e.g., one TCI state) is provided for each configured BWP.

The UE may determine a QCL assumption for monitoring a PDCCH during a BWP switch based on a BWP-specific QCL assumption provided in the RRC configuration 1310. As further illustrated in FIG. 13, QCL #1 may be applied for monitoring PDCCH 1302 in BWP #1, and QCL #2 may be applied for monitoring PDCCH 1304 in BWP #2.

To summarize, a per-BWP RRC parameter may be used to bind a QCL assumption (e.g., a spot beam in NTN scenario) for transmission in a BWP. Individual BWPs may be provided with individual QCL assumptions. A QCL reference may be provided via TCI states.

In some implementations, a QCL assumption in the RRC configuration 1310 may be applied directly without further signaling such as an activation command in a MAC CE. In some implementations, if the per-BWP RRC parameter is applied (e.g., RRC configuration 1310), other beam indication signaling may not be required and may be ignored if provided. In some implementations, beam management behaviour specified in 3GPP TS Rel-15 may be applied if the per-BWP RRC parameter is not configured.

In some implementations, the UE may receive the QCL assumption for individual BWPs via RRC signaling after an initial access or after/accompanied by an RRC handover command. In some implementations, the configured QCL assumption may be applicable to both the PDCCH and PDSCH. In some implementations, if the configured QCL assumption is applicable as a PDSCH QCL assumption, the UE does not expect Tci-PresentInDCI to be configured and, therefore, the TCI field is not present in scheduling DCIs. In some implementations, the configured QCL assumption may be applicable to the PDCCH only.

Case 3: Efficient Indication Based on Group Signalling

The existence of static, yet clustered, terminals in an NTN scenario makes group-based signalling an efficient means for control. One example of such terminals is VSAT, whose sizable dish antenna usually provides mobility capability. In some implementations, the group-based signalling may be applied to a BWP switch and/or QCL indication. In some implementations, the group-based signalling may be applicable to a group of UEs whose control signalling is provided at the same time, such as a handover command.

In some implementations, a DCI format may be provided by UE-group common signaling in which the DCI format is targeted to a plurality of UEs. UEs in a same UE group may share a same DCI format in certain conditions, such as when the DCI format indicates a BWP switch or a QCL indication. In some implementations, a group radio network temporary identifier (RNTI) may be used to provide a BWP switch command or QCL indication command for a group of UEs. The previously described UE may be a mobile terminal or a static VSAT.

The group RNTI may be a new RNTI not defined in 3GPP TS Rel-15/16. In some implementations, a specific CORESET and/or a specific Search Space may be provided for a PDCCH scrambled with the group RNTI.

In some implementations, the group RNTI may be shared by multiple cells but belong to a satellite. For example, the group RNTI may be included in broadcasting system information (SI) and the broadcasting SI may be configured as an area-specific SI (e.g., by associating with the same SI area ID).

In some implementations, the group RNTI may be configured to a UE via dedicated signalling. For example, the group RNTI may be provided together with a specific CORESET and/or a specific Search Space for a PDCCH scrambled with the group RNTI.

In some implementations, a DCI field may be included in DCI provided by a PDCCH scrambled by a paging RNTI (e.g., P-RNTI) for indicating a BWP switch or QCL assumption switch.

Implementations in case 3 may be combined with other implementations provided in case 1 and/or case 2. For example, the DCI format in case 1 and/or case 2 may be provided by UE-group common signaling.

Case 4: UE-Triggered BWP Switch

Considering fast moving satellites, a satellite (e.g., a satellite having functions of a gNB) may need to trigger a BWP switch blindly (e.g., without a beam report or the reporting result is out of date). Thus, the gNB may provide at least one BWP (e.g., two BWPs) with an associated BWP index and TCI information to the UE. Selecting which BWP to access may be according to UE implementation. In some implementations, the UE may not be allowed to simultaneously access two BWPs even if the gNB provides the two BWPs via, for example, an DCI format. If the selected BWP is accessible, the UE may send an acknowledgement (ACK) to the gNB; otherwise, the UE may select another BWP and attempt the access accordingly. In some implementations, the gNB may provide a switching request in a source BWP, and the UE may send an indication (ACK/NACK in response to the request) in a target BWP. In some implementations, the UE may use a physical random access channel (PRACH), which may be either a CBRA or contention-free random access (CFRA), or other sequence-based transmission (e.g., sounding reference signal (SRS)) to send the indication. The transmission may be used for purposes such as timing advance (TA) adjustment.

Figure 14:
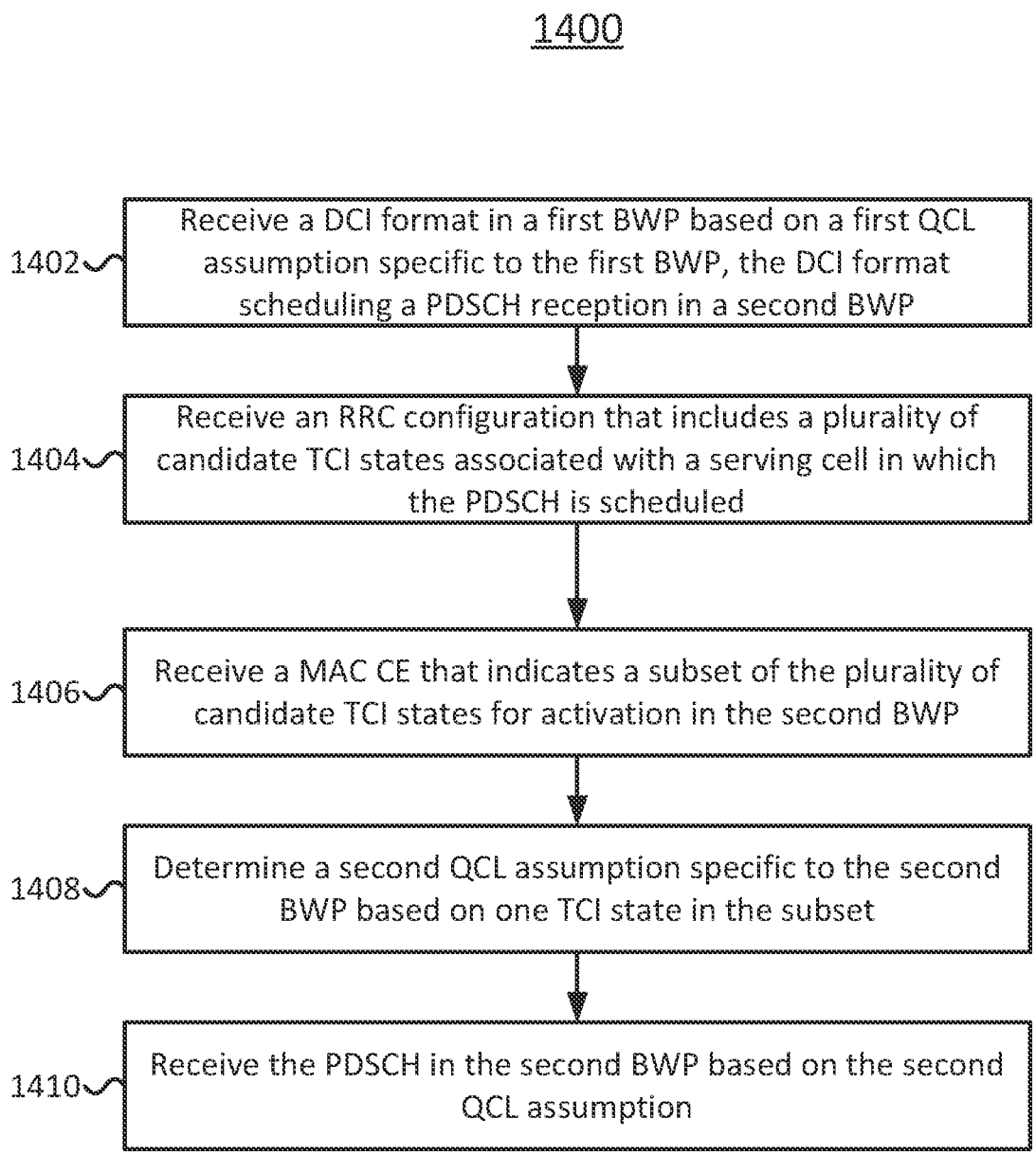
FIG. 14 is a flowchart illustrating a method performed by a UE for beam management according to an example implementation of the present disclosure.

FIG. 14 is a flowchart illustrating a method 1400 performed by a UE for beam management according to an example implementation of the present disclosure. Example implementations of the method 1400 may be referred to case 1-1, 1-2, FIG. 8, and FIG. 9. In action 1402, the UE receives a DCI format in a first BWP based on a first QCL assumption specific to the first BWP, the DCI format scheduling a PDSCH reception in a second BWP. Referring to FIG. 9, the DCI format in the first BWP may be in the PDCCH 902 in BWP #1, and the PDSCH received in the second BWP may be the PDSCH 904 in BWP #2.

In action 1404, the UE receives an RRC configuration that includes a plurality of candidate TCI states associated with a serving cell in which the PDSCH is scheduled. In action 1406, the UE receives a MAC CE that indicates a subset of the plurality of candidate TCI states for activation in the second BWP. In action 1408, the UE determines a second QCL assumption specific to the second BWP based on one TCI state in the subset. In action 1410, the UE receives the PDSCH in the second BWP based on the second QCL assumption. Referring to FIG. 9, the MAC CE may be MAC CE 910 in FIG. 9, and the UE may receive the PDSCH 904 based on the QCL assumption that is determined based on TCI state #12 activated by the MAC CE 910.

In some implementations, the UE may apply the disclosed methods (including case 1 through case 4) when the UE is aware of an NTN scenario. In some implementations, the NTN scenario may be signaled to the UE via at least one of an RRC parameter, a MAC CE, and a DCI format. Referring to the example illustrated in FIG. 9, the reception of PDCCH 902 and PDSCH 904 may be indicated as the NTN scenario. The UE may then apply the QCL assumption indicated by the MAC CE 910 for receiving the PDSCH 904 after identifying the NTN scenario.

It should be noted that although implementations provided in this disclosure focus on the DL, it is possible to associate a UL BWP with the spatial relation information by using similar methods whenever applicable. Further, at least the spatial QCL assumption determined based on the disclosed implementations may be applied for determining spatial relation information in an active UL BWP when a beam correspondence requirement is applicable.

Figure 15:
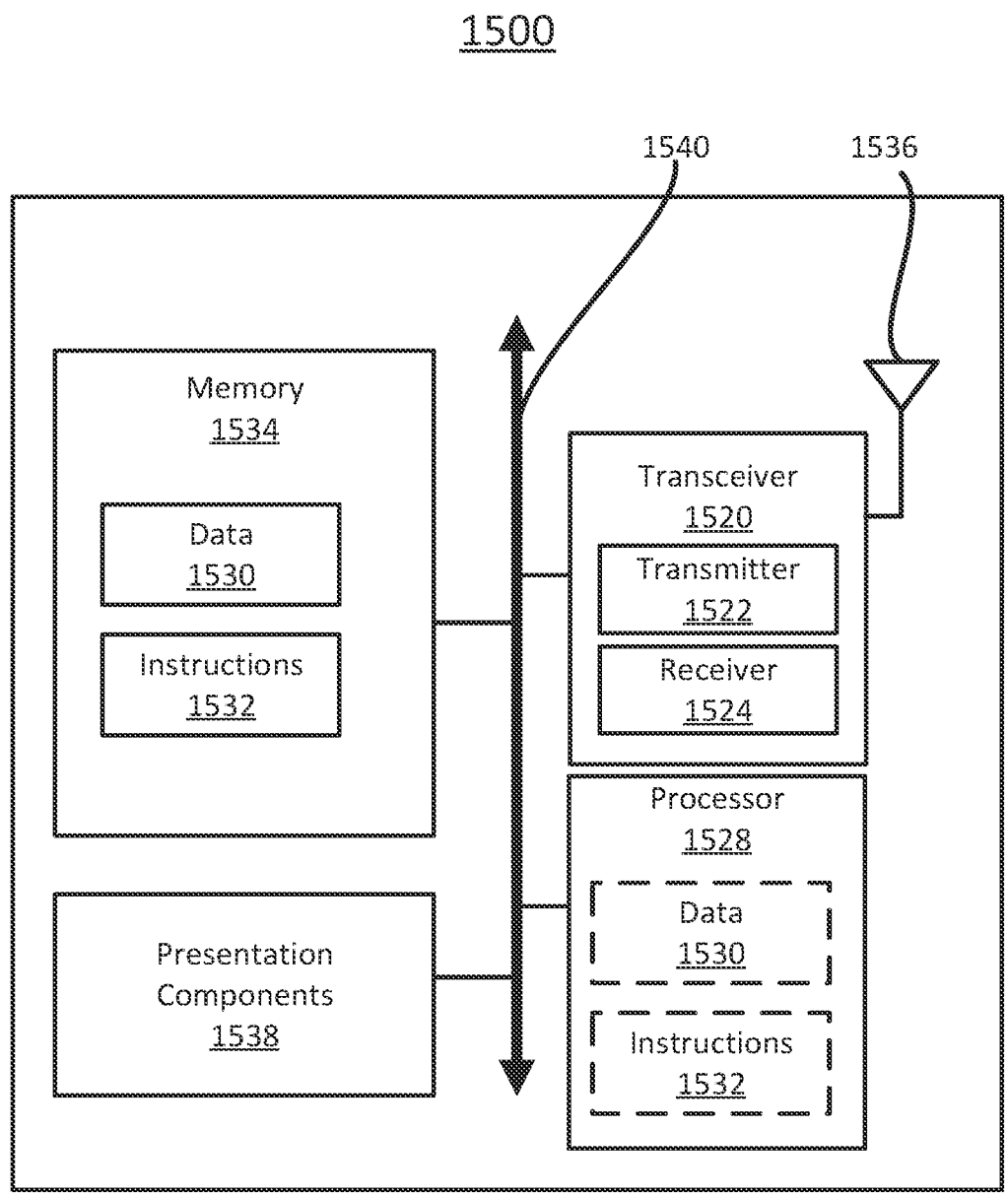
FIG. 15 is a block diagram illustrating a node for wireless communication in accordance with various aspects of the present disclosure.

FIG. 15 is a block diagram illustrating a node 1500 for wireless communication according to the present disclosure. As illustrated in FIG. 15, the node 1500 may include a transceiver 1520, a processor 1528, a memory 1534, one or more presentation components 1538, and at least one antenna 1536. The node 1500 may also include an RF spectrum band module, a BS communications module, a network communications module, and a system communications management module, Input/Output (I/O) ports, I/O components, and a power supply (not illustrated).

Each of the components may directly or indirectly communicate with each other over one or more buses 1540. The node 1500 may be a UE or a BS that performs various functions disclosed with reference to FIGS. 1 through 14.

The transceiver 1520 has a transmitter 1522 (e.g., transmitting/transmission circuitry) and a receiver 1524 (e.g., receiving/reception circuitry) and may be configured to transmit and/or receive time and/or frequency resource partitioning information. The transceiver 1520 may be configured to transmit in different types of subframes and slots including, but not limited to, usable, non-usable and flexibly usable subframes and slot formats. The transceiver 1520 may be configured to receive data and control channels.

The node 1500 may include a variety of computer-readable media. Computer-readable media may be any available media that may be accessed by the node 1500 and include both volatile and non-volatile media, removable and non-removable media.

The computer-readable media may include computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not include a propagated data signal. Communication media typically embody computer-readable instructions, data structures, program modules or other data in a modulated data signal such as a carrier wave or other transport mechanism and include any information delivery media.

The term "modulated data signal" means a signal that has one or more of its characteristics set or changed in order to encode information in the signal. Communication media include wired media, such as a wired network or direct-wired connection, and wireless media, such as acoustic, RF, infrared and other wireless media. Combinations of any of the previously listed components is also included within the scope of computer-readable media.

The memory 1534 may include computer-storage media in the form of volatile and/or non-volatile memory. The memory 1534 may be removable, non-removable, or a combination thereof.

Example memory includes solid-state memory, hard drives, optical-disc drives, etc. As illustrated in FIG. 15, the memory 1534 may store computer-readable, computer-executable instructions 1532 (e.g., software codes) that are configured to cause the processor 1528 to perform various disclosed functions with reference to FIGS. 1 through 14. Alternatively, the instructions 1532 may not be directly executable by the processor 1528 but, may instead be configured to cause the node 1500 (e.g., when compiled and executed) to perform various functions disclosed herein.

The processor 1528 (e.g., having processing circuitry) may include an intelligent hardware device, e.g., a Central Processing Unit (CPU), a microcontroller, an ASIC, etc. The processor 1528 may include memory.

The processor 1528 may process the data 1530 and the instructions 1532 received from the memory 1534, and information transmitted and received via the transceiver 1520, the base band communications module, and/or the network communications module. The processor 1528 may also process information to be sent to the transceiver 1520 for transmission via the antenna 1536 to the network communications module for transmission to a core network.

One or more presentation components 1538 present data to a person or another device. Examples of presentation components 1538 include a display device, a speaker, a printing component, and a vibrating component.

In view of the present disclosure, it is obvious that various techniques may be used for implementing the concepts in the present disclosure without departing from the scope of those concepts. Moreover, while the concepts have been disclosed with specific reference to certain implementations, a person of ordinary skill in the art may recognize that changes may be made in form and detail without departing from the scope of those concepts.

As such, the described implementations are to be considered in all respects as illustrative and not restrictive. It should also be understood that the present disclosure is not limited to the particular disclosed implementations and many rearrangements, modifications, and substitutions are possible without departing from the scope of the present disclosure.

What is claimed is:

1. A equipment (UE) for beam management, the UE comprising:
at least one processor; and
at least one non-transitory computer-readable medium storing one or more computer-executable instructions that, when executed by the at least one processor, cause the UE to:
receive a downlink control information (DCI) format in a first band width part (BWP) based on a first quasi co-located (QCL) assumption specific to the first BWP, the DCI format scheduling a reception of a physical downlink shared channel (PDSCH) in a second BWP;
receive a radio resource control (RRC) configuration that includes a plurality of candidate transmission configuration indication (TCI) states associated with a serving cell in which the reception of the PDSCH is scheduled;
receive a medium access control (MAC) control element (CE) that indicates a subset of the plurality of candidate TCI states for activation in the second BWP;
determine a second QCL assumption specific to the second BWP based on one candidate TCI state in the subset of the plurality of candidate TCI states;
initiate a random access procedure and transmit an acknowledgement in the second BWP; and
receive, after the random access procedure is initiated, the PDSCH in the second BWP based on the second QCL assumption.

2. The UE of claim 1, wherein the MAC CE is received in the first BWP before receiving the DCI format scheduling the reception of the PDSCH in the second BWP.

3. The UE of claim 1, wherein a number of candidate TCI states in the subset of the plurality of candidate TCI states is one.

4. The UE of claim 1, wherein the second QCL assumption is determined based on the one candidate TCI state in the subset of the plurality of candidate TCI states having a smallest index.

5. The UE of claim 1, wherein the second QCL assumption is identical to a third QCL assumption used for receiving a physical downlink control channel (PDCCH) in the second BWP.

6. The UE of claim 5, wherein the third QCL assumption corresponds to a control resource set (CORESET) associated with a monitored search space with a lowest CORESET identifier (ID) in a latest slot in which one or more CORESETs within the second BWP are monitored by the UE.

7. The UE of claim 5, wherein the third QCL assumption corresponds to a control resource set (CORESET) with a lowest CORESET identifier (ID) within the second BWP.

8. The UE of claim 1, wherein the one or more computer-executable instructions, when executed by the at least one processor, further cause the UE to:
receive a second RRC configuration that associates the first BWP with the first QCL assumption and associates the second BWP with the second QCL assumption.

9. The UE of claim 1, wherein the DCI format is received from a UE-group common signaling in which the DCI format is targeted to a plurality of UEs.

10. The UE of claim 1, wherein the DCI format and the PDSCH are associated with a Non-Terrestrial Network (NTN).

11. A method for beam management performed by a user equipment (UE), the method comprising:
receiving a downlink control information (DCI) format in a first bandwidth part (BWP) based on a first quasi co-located (QCL) assumption specific to the first BWP, the DCI format scheduling a reception of a physical downlink shared channel (PDSCH) in a second BWP;
receiving a radio resource control (RRC) configuration that includes a plurality of candidate transmission configuration indication (TCI) states associated with a serving cell in which the reception of the PDSCH is scheduled;
receiving a medium access control (MAC) control element (CE) that indicates a subset of the plurality of candidate TCI states for activation in the second BWP;
determining a second QCL assumption specific to the second BWP based on one candidate TCI state in the subset of the plurality of candidate TCI states;
initiating a random access procedure and transmitting an acknowledgement in the second BWP; and
receiving, after the random access procedure is initiated, the PDSCH in the second BWP based on the second QCL assumption.

12. The method of claim 11, wherein the MAC CE is received in the first BWP before receiving the DCI format scheduling the reception of the PDSCH in the second BWP.

13. The method of claim 11, wherein a number of candidate TCI states in the subset of the plurality of candidate TCI states is one.

14. The method of claim 11, wherein the second QCL assumption is determined based on the one candidate TCI state in the subset of the plurality of candidate TCI states having a smallest index.

15. The method of claim 11, wherein the second QCL assumption is identical to a third QCL assumption used for receiving a physical downlink control channel (PDCCH) in the second BWP.

16. The method of claim 15, wherein the third QCL assumption corresponds to a control resource set (CORESET) associated with a monitored search space with a lowest CORESET identifier (ID) in a latest slot in which one or more CORESETs within the second BWP are monitored by the UE.

17. The method of claim 15, wherein the third QCL assumption corresponds to a control resource set (CORESET) with a lowest CORESET identifier (ID) within the second BWP.

18. The method of claim 11, further comprising:
receiving a second RRC configuration that associates the first BWP with the first QCL assumption and associates the second BWP with the second QCL assumption.

19. The method of claim 11, wherein the DCI format is received from a UE-group common signaling in which the DCI format is targeted to a plurality of UEs.

20. The method of claim 11, wherein the DCI format and the PDSCH are associated with a Non-Terrestrial Network (NTN).

* * * * *